United States Patent
Varner et al.

(10) Patent No.: US 9,619,127 B2
(45) Date of Patent: Apr. 11, 2017

(54) USER CONTROLLED DATA SPEED SELECTOR SYSTEMS AND METHODS

(71) Applicant: NETZERO WIRELESS, INC., Woodland Hills, CA (US)

(72) Inventors: Curtis Varner, Oak Park, CA (US); Andrew Rosen, Woodland Hills, CA (US); David Dowling, Los Angeles, CA (US)

(73) Assignee: NETZERO WIRELESS, INC., Woodland Hills, CA (US)

( * ) Notice: Subject to any disclaimer, the term of this patent is extended or adjusted under 35 U.S.C. 154(b) by 756 days.

(21) Appl. No.: 13/784,682

(22) Filed: Mar. 4, 2013

(65) Prior Publication Data

US 2013/0275877 A1 Oct. 17, 2013

Related U.S. Application Data

(60) Provisional application No. 61/625,622, filed on Apr. 17, 2012.

(51) Int. Cl.
*G06F 3/048* (2013.01)
*G06F 3/0484* (2013.01)
*H04W 4/00* (2009.01)
*H04L 12/825* (2013.01)

(52) U.S. Cl.
CPC .......... *G06F 3/04847* (2013.01); *H04L 47/26* (2013.01); *H04W 4/001* (2013.01)

(58) Field of Classification Search
None
See application file for complete search history.

(56) References Cited

U.S. PATENT DOCUMENTS

| | | | |
|---|---|---|---|
| 2008/0162630 A1* | 7/2008 | Moore | H04L 12/5695 709/203 |
| 2008/0165701 A1* | 7/2008 | Ananthanarayanan | G06Q 30/06 370/254 |
| 2010/0299236 A1* | 11/2010 | Cassell | G06Q 30/04 705/34 |
| 2013/0130643 A1* | 5/2013 | Bacareza et al. | 455/406 |

OTHER PUBLICATIONS

Kharif, Olga, Roi Tiger Has Salvation for Data Hogs, Bloomberg Business week http://www.businessweek.com/articles/2012-03-28/roi-tiger-has-salvation-for-data-hogs, dated Mar. 29, 2012, 2 pgs.

* cited by examiner

*Primary Examiner* — William Trapanese
(74) *Attorney, Agent, or Firm* — Foley & Lardner LLP

(57) ABSTRACT

A method in accordance with an embodiment allows for a user to change a wireless speed setting for a device. The method includes sending, from a server over a network, information for displaying an interface in a web page to allow a user to change a wireless speed setting for the device. The method further includes receiving, by the server over the network, a selected wireless speed setting as input by the user into the interface. The change of the wireless speed is then performed by sending, to a computer of a wireless network provider, a request to change the wireless speed setting for the device to the selected wireless speed setting.

30 Claims, 18 Drawing Sheets

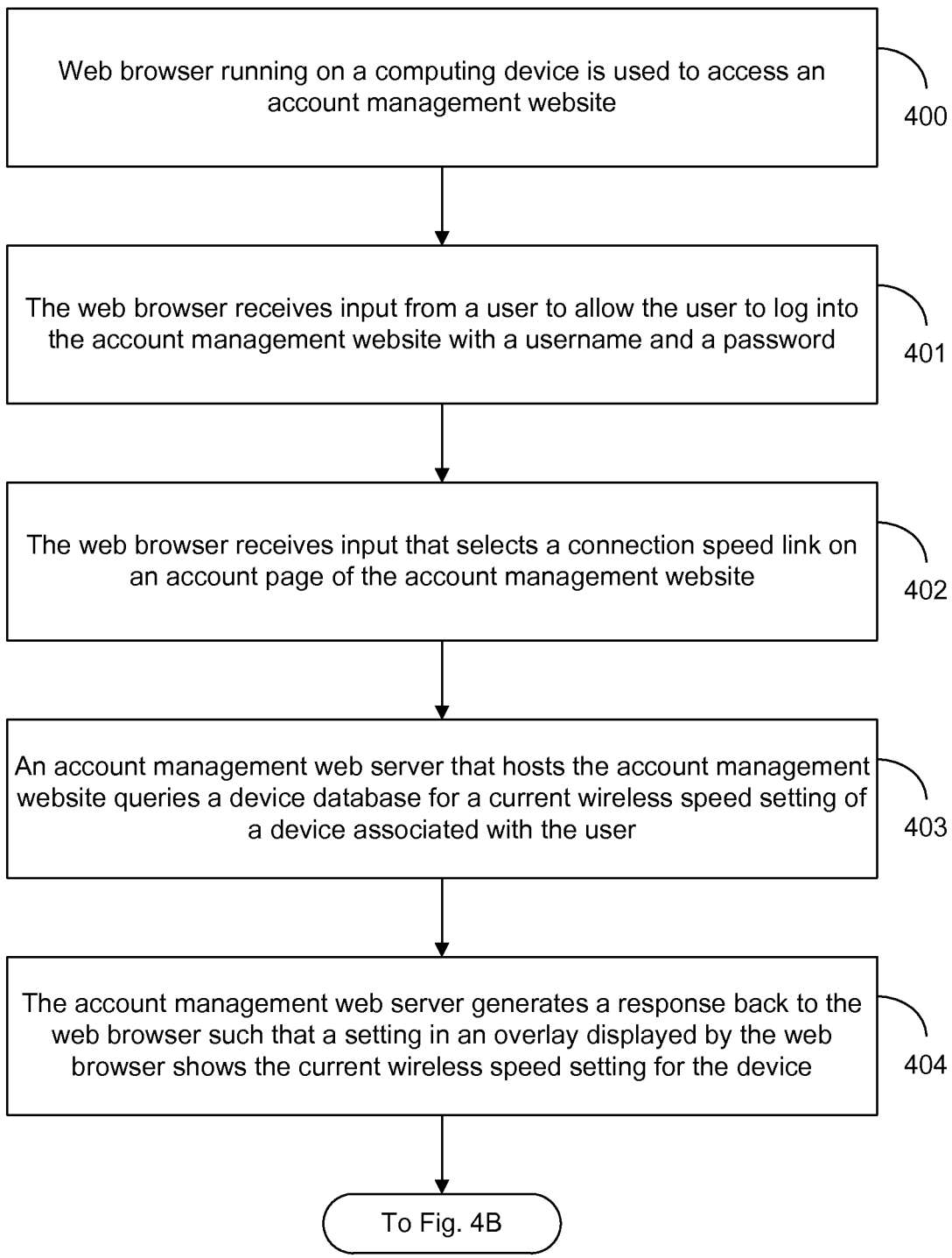

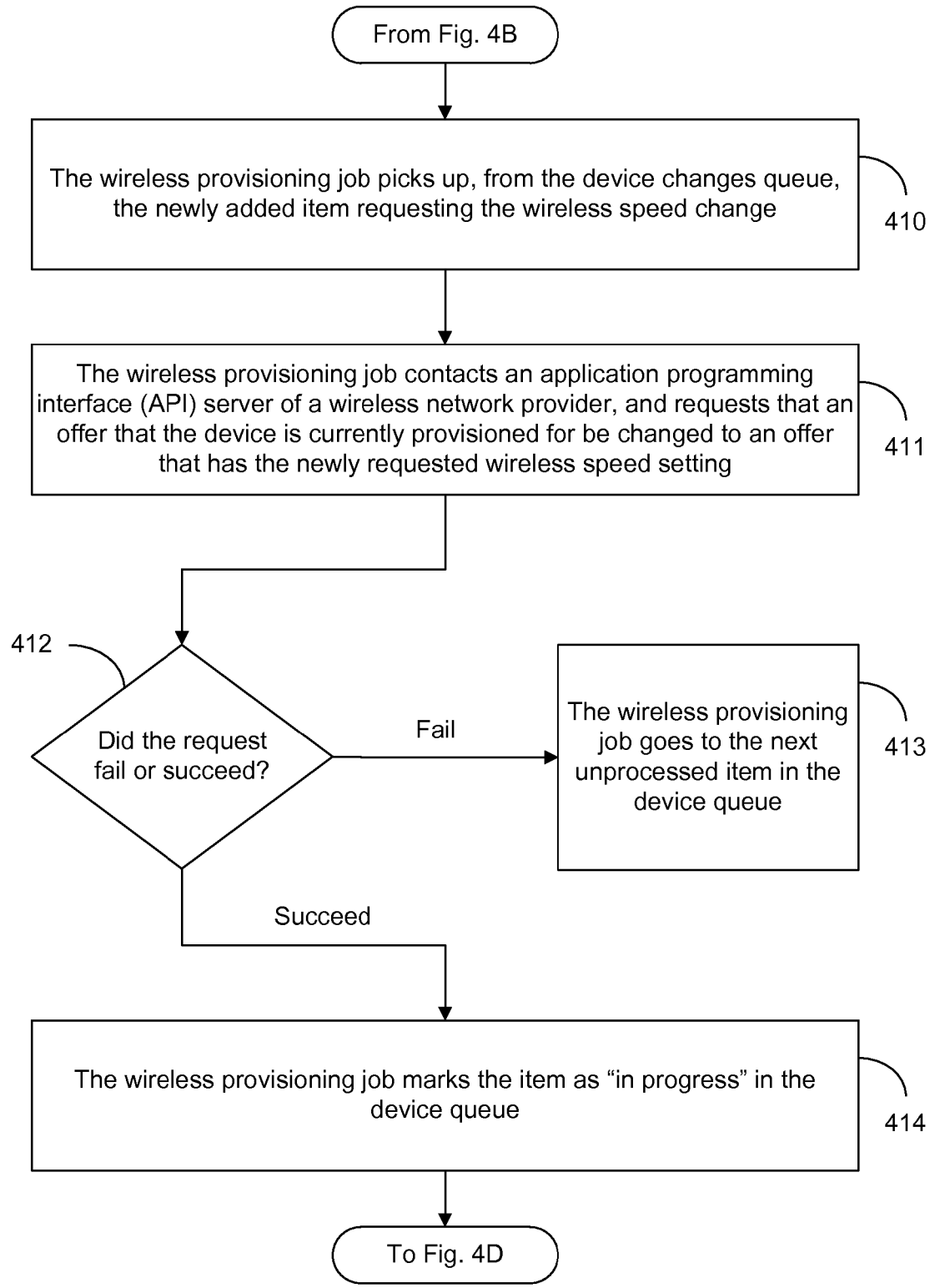

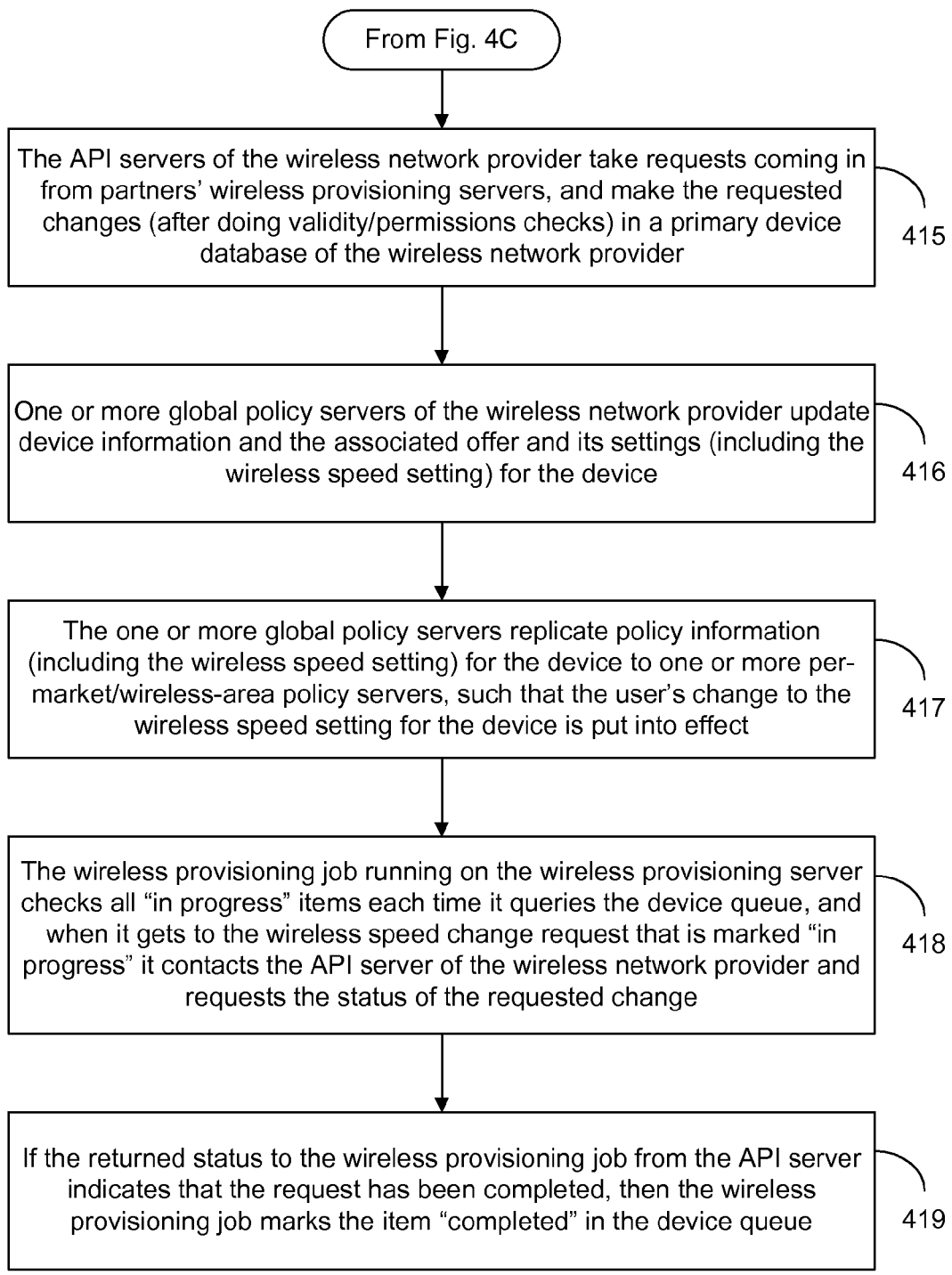

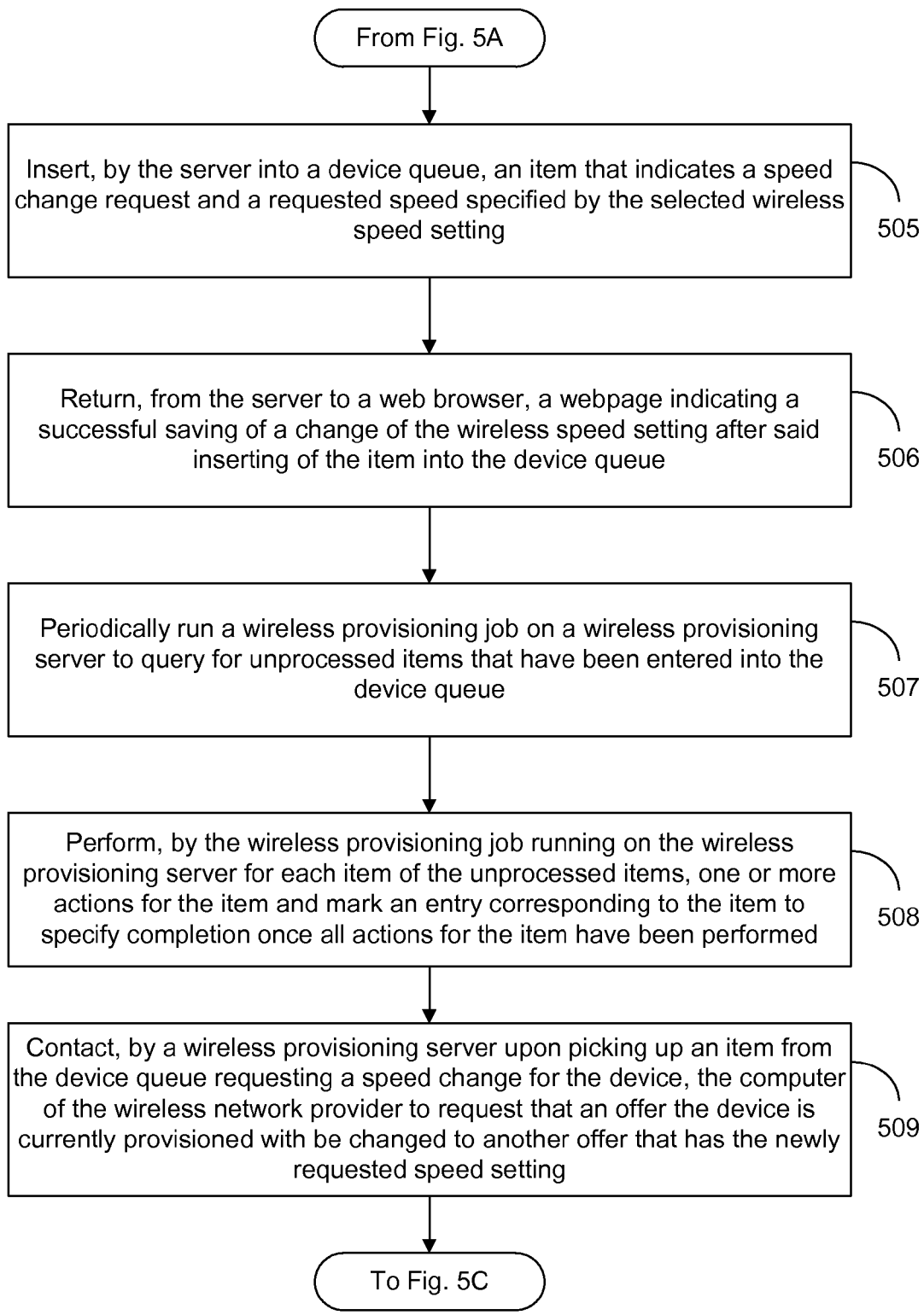

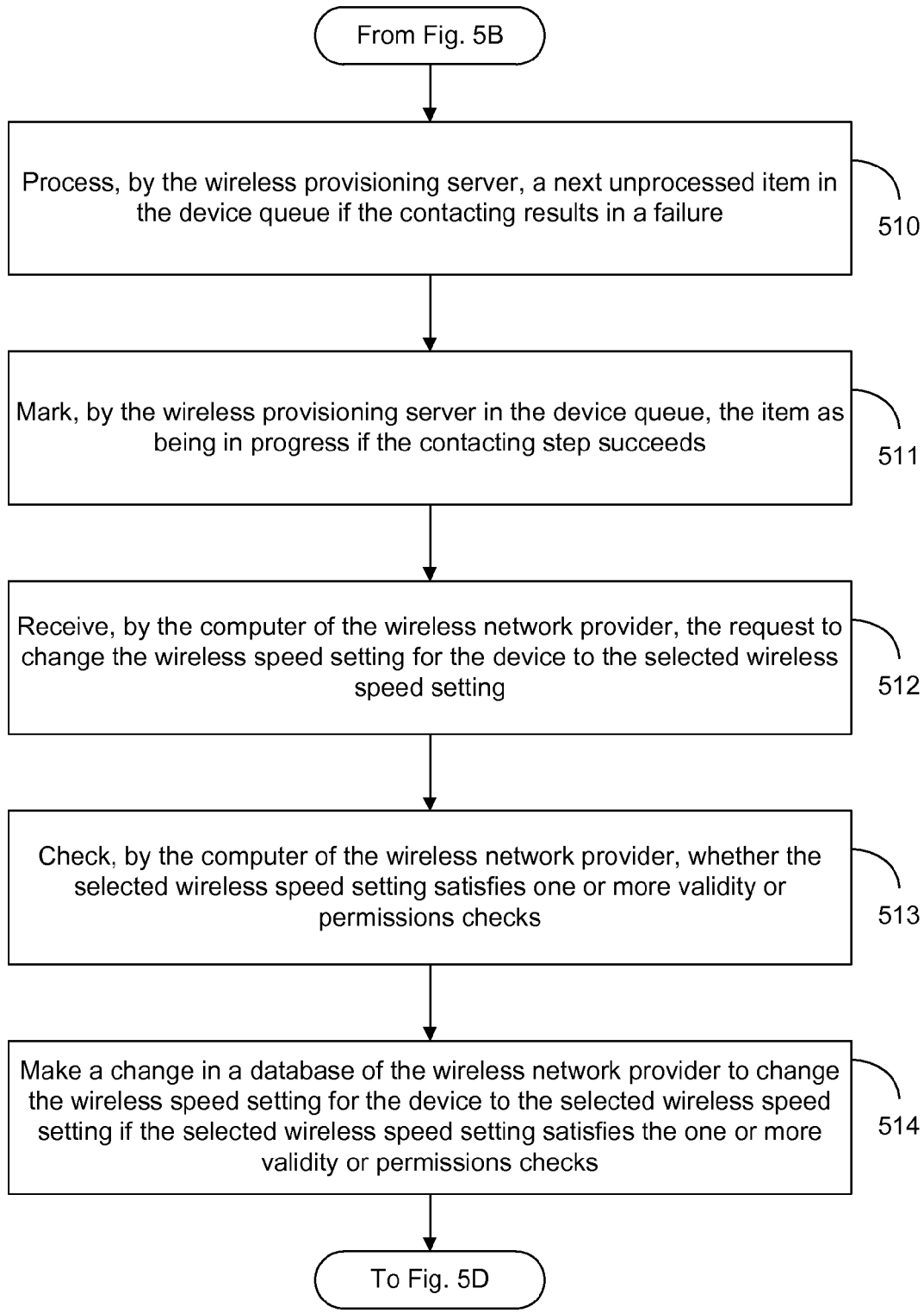

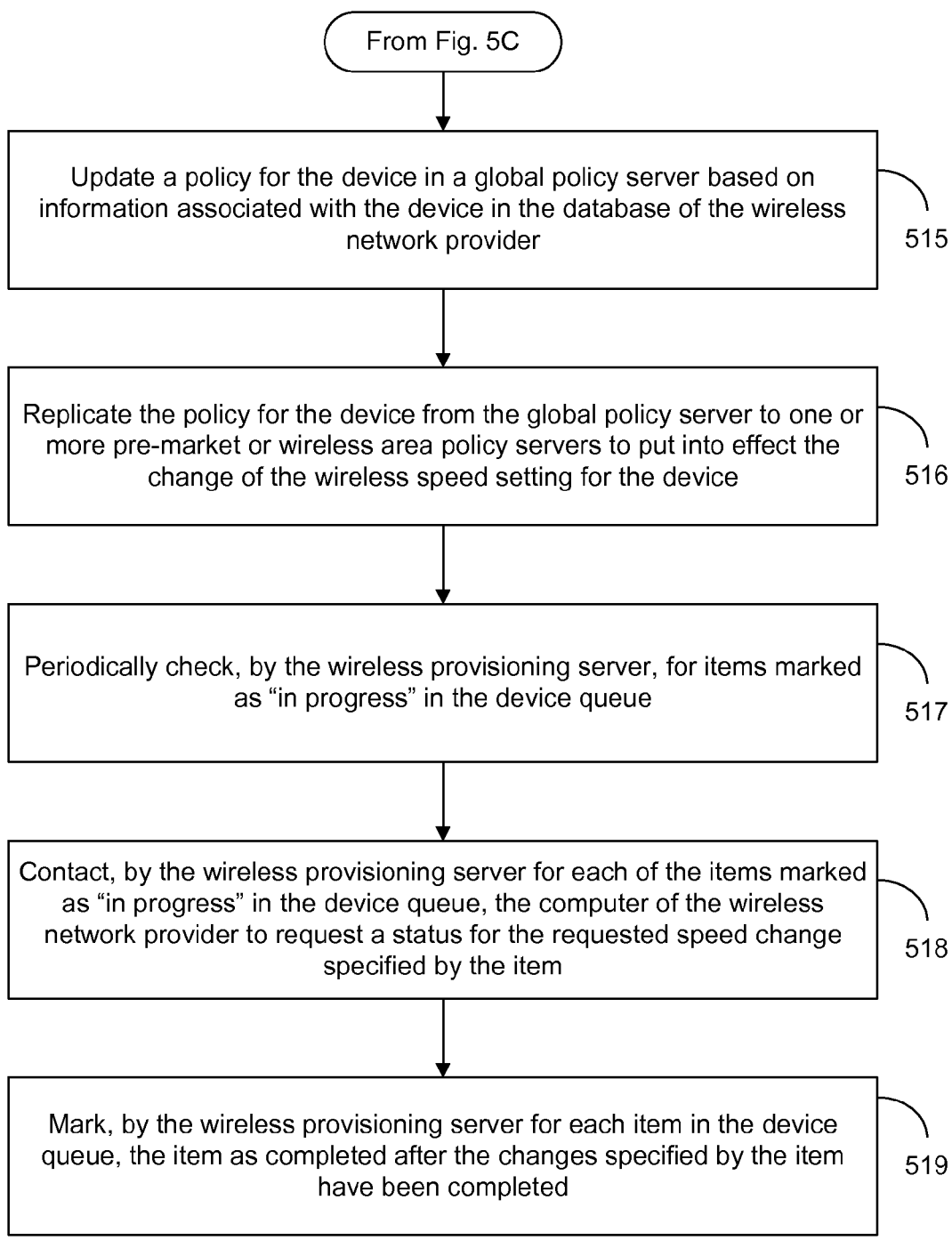

USER CONTROLLED DATA SPEED SELECTOR SYSTEMS AND METHODS

CROSS-REFERENCE TO RELATED PATENT APPLICATIONS

This application claims the benefit of U.S. Provisional Patent App. Ser. No. 61/625,622, filed Apr. 17, 2012, incorporated herein by reference in its entirety.

FIELD

Aspects of systems and methods disclosed herein relate generally to the field of mobile broadband communication. More specifically, various aspects are directed to enabling mobile broadband users to adjust a wireless speed for their electronic devices.

BACKGROUND

Mobile broadband providers sell allotments of data to mobile device users. When a mobile device user exceeds an amount of the data allotted, a provider may charge overage fees to the user based on previously agreed upon overage fees. A data rate provided by the mobile broadband provider may significantly affect an amount of data that is used by the mobile device user.

SUMMARY

A method in accordance with an embodiment allows for a user to change a wireless speed setting for a device. The method includes sending, from a server over a network, information for displaying an interface in a web page to allow a user to change a wireless speed setting for the device. The method further includes receiving, by the server over the network, a selected wireless speed setting as input by the user into the interface. The change of the wireless speed is performed by sending, to a computer of a wireless network provider, a request to change the wireless speed setting for the device to the selected wireless speed setting.

A speed selector feature allows for selecting a wireless speed for wireless communications performed by a wireless device. In various embodiments, the speed selector feature provides for at least two different wireless speed settings (such as, for example, two different 4G wireless speed settings), and allows an end user of a wireless service to change between any of the available wireless speeds at any time. For example, in various embodiments there are two available wireless speeds settings, such as but not limited to (i) a first speed setting, which may be called "LightSpeed," that limits a download speed to the wireless device to 1 Mbit/s and limits an upload speed from the wireless device to 384 Kb/s; and (ii) a second speed setting, which may be called "WarpSpeed," in which a wireless speed for the wireless device is limited only by provider, location, and environmental factors at a current location of the wireless device. In various embodiments, the wireless network provider's maximum wireless speeds may allow, for example, for 10 Mbits/s download and 1.5 Mbit/s upload speeds.

Initial settings for a wireless speed setting may be based on a data plan purchased by an end-user. There may be various plans that allow for different amounts of monthly data to be used by the end-user. In addition to price and data allotment, each wireless data plan may also specify a default speed setting for that plan. For example, a free plan with 200 MB/month for 12 months and a $9.95 plan with 500 MB/month may both default to the LightSpeed setting, and higher plans (such as, for example, 1 GB/$19.95, 2 GB/$34.95, and 4 GB/$49.95) may default to the WarpSpeed setting.

In various embodiments, a server provides a website at which the user can access their account information. On web pages for the user's account provided by the website, the user can view, for example, data usage and billing history, and can manage, for example, their profile. In various embodiments, within a wireless service tile on one or more of the web pages of the website, there is a web page resource, such as a link, that allows the end-user to change their current wireless speed setting for their wireless device. In some embodiments, clicking the link brings up an overlay or another web page showing the current wireless speed setting for the wireless device, as well as maximum speeds for each of the selectable wireless speed settings. The user can then change the wireless speed setting and click "save" to affect the change. In various embodiments, saving a changed wireless speed setting enqueues information associated with the user's wireless device in a provisioning change queue.

Service provisioning can be used to change the wireless speed of the user's wireless device when a change in the wireless speed setting is selected by the user. In various embodiments, a wireless provider supports the concept of an "offer" in their system, and each offer has various attributes, including maximum upload and download speeds. For example, a first offer, which may be called a "WarpSpeed offer," may have no bandwidth limitations, while a second offer, which may be called a "LightSpeed offer," may have all the same settings as the "WarpSpeed offer" except that the download speed may be limited to 1 Mbit/s and the upload speed may be limited to 384 Kbit/s.

In various embodiments, the wireless device does not know which data speeds it will be provisioned with by the network, and the data speeds are controlled on the network side by the wireless network provider, account management system, and/or user requests to the account management system. In some embodiments, during initial provisioning of the wireless device within the wireless provider's network, the wireless provisioning code may simply look at a setting on the wireless device (which could be the same as the plan's default setting) and either provision the wireless device with the WarpSpeed offer or the LightSpeed offer. In various embodiments, at any time the user can change the speed setting. Also, in various embodiments, wireless provisioning sees the requested change within several minutes, and calls an application programming interface ("API") to change the wireless device from a current offer to a new offer. Upon confirmation that the change has been made, the user will see the speed lower or raise automatically. In various embodiments, there is no need for a user to disconnect/reconnect or power cycle their wireless device to have the changes to the wireless speed setting take effect.

In various embodiments, a wireless user's wireless network speed is set to one of a plurality of possible initial settings depending on a wireless data plan the user purchases. In some embodiments, if the user subsequently upgrades or downgrades their wireless data plan, the user's network speed defaults to the new wireless data plan's speed regardless of its current setting. In some such embodiments, a user can otherwise change the speed of their wireless connection at any time, as many times as they want.

BRIEF DESCRIPTION OF THE DRAWINGS

FIG. 4A illustrates a flowchart of a method for changing a wireless network speed for a device in accordance with an embodiment;

FIG. 4C continues the flowchart of FIGS. 4A and 4B;

FIG. 4D continues the flowchart of FIGS. 4A, 4B, and 4C;

FIG. 5B continues the flowchart of FIG. 5A;

FIG. 5C continues the flowchart of FIGS. 5A and 5B;

FIG. 5D continues the flowchart of FIGS. 5A, 5B, and 5C;

DETAILED DESCRIPTION OF PREFERRED EMBODIMENTS

Figure 1A:
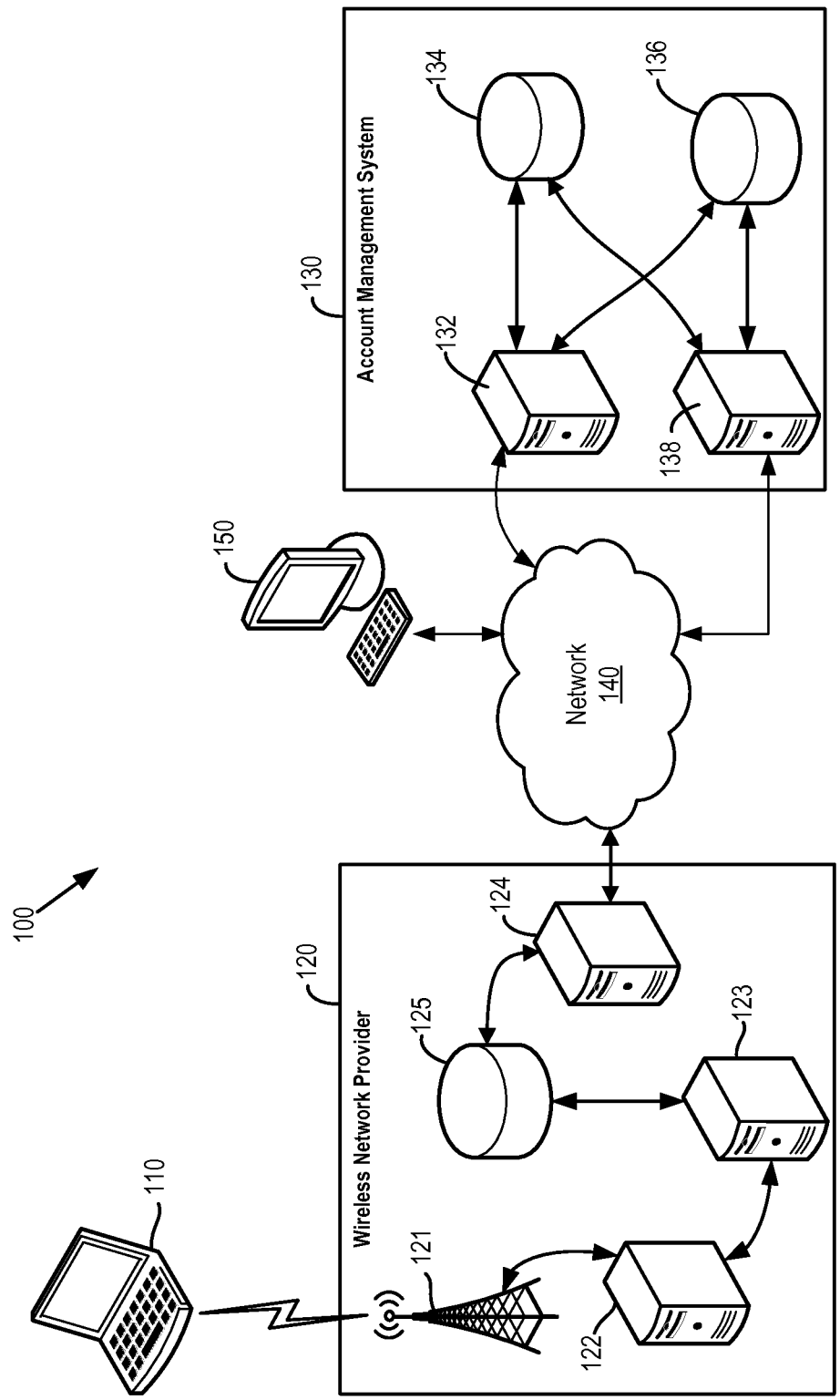
FIG. 1A is a schematic diagram of a computer-implemented data processing system according to an example embodiment.

FIG. 1A shows a computer-implemented data processing system 100 that may be used by a user to manage a wireless account associated with a mobile device. The user may be a business entity and/or an individual consumer that has purchased a periodically renewing amount of data from a wireless service provider. The wireless service provider may provide an allotment of data based on an agreement with the user. The agreement may specify the highest data transfer rates that are available in various geographic locations. Additionally, implementations of the data processing system 100 allow the user to throttle a data transfer rate to be less than the highest data transfer rates that are available in any given geographic area. In some embodiments, the data transfer rate may be automatically updated by the data processing system 100 based on the billing cycle of the wireless account. For example, after a predetermined period of time of the billing cycle passes (e.g., half way through the billing cycle), the data processing system 100 may automatically lower or increase the data transfer rate for the remaining portion of the billing cycle. In other embodiments, the user of the mobile device can update the data transfer rate using one or more user interfaces. In other embodiments, the data transfer rate may be automatically updated by the data processing system 100 based on the size of a web page being downloaded.

The data processing system 100 may include, among other devices, a wireless device 110, a wireless network provider 120, an account management system 130, network 140, and a computing device 150. The wireless network provider 120, the account management system 130, and the computing device 150 may communicate through the network 140, which may include one or more of the Internet, cellular networks, Wi-Fi networks, WiMAX networks, a proprietary communication network, and/or the like. The wireless device 110, the wireless network provider 120, the account management system 130, and the computing device 150 may each comprise a computer system (e.g., one or more processors) configured to execute instructions, send and receive data stored in non-transitory storage mediums (memory), and perform other operations to implement the operations described herein associated with processes shown in FIGS. 4A through 4D, 5A through 5D, and 6 through 9.

The wireless device 110 includes at least one wireless antenna that communicates with the wireless network provider 120. In some embodiments, the wireless device 110 includes at least one wireless antenna that communicates with one or more other mobile computing devices. In these embodiments, the wireless device 110 may act as a wireless or wired router to one or more mobile computing devices and may allow the mobile computing devices to communicate with the network 140. In yet another embodiment, the wireless device 110 may communicate with one or more mobile computing devices via a Wi-Fi, NFC, and/or Bluetooth protocol. In one embodiment, the wireless device 110 may have a Universal Serial Bus (USB) connector that connects to a USB connector of a mobile computing device. The mobile computing device could be a desktop, laptop, tablet personal computer (PC), tablet, mobile telephone, smart phone, and so on. In another embodiment, the wireless device 110 may communicate with a computing device via a USB connection and communicate wirelessly with the wireless network provider 120. In another embodiment, the wireless device 110 may communicate with some computing devices via a wireless link and with other computing devices thought wired (CAT 5, USB, and/or Thunderbolt) cables. In one embodiment, the wireless device 110 can receive power from at least one of a battery, in-wall power outlet, USB connector, or inductive power transfer to a battery.

The wireless device 110 may be used by an individual user (e.g., a business owner or employee, a consumer, and so on) to interact with the network 140 and account management system 130. The wireless device 110 may, for example, be a cellular phone, smart phone, mobile handheld wireless e-mail device, personal digital assistant, portable gaming devices, tablet, router, or other suitable device. The wireless device 110 may include a network interface device, a display device (e.g. Liquid Crystal Display (LCD) screen, Light Emitting Diode (LED) screen, indicator lights), an input device (e.g. keyboard, mouse, buttons and/or switches and so on), and a storage medium.

In one embodiment, the wireless device 110 may be a computing device with a processor coupled to a machine readable storage medium. In this embodiment, the computing device may have a wireless antenna that is configured to communicate using at least one of a WiMax (IEEE 802.16 standard), 2G, HSPA™, HSPA+™, 802.11a-802.11z™, 3G™, LTE™, or 4G™ protocol and/or other wireless protocols. The wireless device 110 may be configured to communicate with a base station 121 that can communicate with the network 140, other wireless network provider systems, or the account management system 130.

The wireless network provider 120 includes various systems and computers. In one embodiment, the wireless network provider 120 includes the base station 121, a market policy server 122, a global policy server 123, an API server 124, and a device database 125. In one embodiment, the base station 121, the market policy server 122, the global policy server 123, the API server 124, and the device database 125 are implemented on a single unitary computer system. Alternatively, the base station 121, the market policy server 122, the global policy server 123, the API server 124, and the device database 125 can each be implemented on a plurality of distributed computer systems that are connected with each other. Additionally or alternatively, the base station 121, the market policy server 122, the global policy server 123, the API server 124, and the device database 125 may be remotely located (e.g. in different buildings or cities) from each other and receive power from different power outlets. In one embodiment, the base station 121 may be remotely located from the market policy server 122, the global policy server 123, the API server 124, and the device database 125. In some embodiments, the base station 121 can connect through a proprietary wired system with one or more of the market policy server 122, the global policy server 123, the API server 124, and the device database 125.

The base station 121 includes a plurality of antennas that are capable of communicating wirelessly with various different types of mobile devices. In some embodiments, the base station 121 communicates with various components of the wireless network provider 120. Additionally, in some embodiments, the base station 121 is configured to communicate with the network 140 or other proprietary or public networks (e.g., the Internet). In some embodiments, the base station 121 communicates data to and from the wireless device 110, and to and from the network 140. In some embodiments, the wireless device 110 and the base station 121 work together to act as an intermediary between the computing device 150 and the network 140.

The market policy server 122 may also be known as a wireless area policy server or a pre-market policy server. The market policy server 122 is implemented as a computer system with a processor coupled to a non-transitory storage medium. The market policy server 122 includes network communication components that are capable of communicating with the global policy server 123. The market policy server 122 receives policy parameters from the global policy server 123 to put into effect a change of a wireless speed setting for the wireless device 110. The policy parameters may be changed by the user of the wireless device 110, the wireless network provider 120, the account management system 130, or by a user from the computing device 150. The policy parameters can include the data transfer speeds at which the wireless device 110 uploads and downloads data from the network 140. The policy parameters can include authentication information for the wireless device 110. The market policy server 122 may conduct network resource management among a plurality of wireless devices that are similar to the wireless device 110. Network resource management includes, for example, authentication, wireless device usage tracking, tracking client use patterns, logging changes or modifications, providing automatic updates, and maintaining data privacy. The market policy server 122 can enforce the policies it receives from the global policy server 123.

In various embodiments, the global policy server 123 is implemented in a computer system with a processor coupled to a non-transitory storage medium. Also, in various embodiments, the global policy server 123 includes communication components that are capable of communicating with the market policy server 122, the API server 124, the device database 125, and the network 140. The global policy server 123 receives policy parameters from the account management system 130 via the network 140 to put into effect the change of the wireless data transfer rates for the wireless device 110. In some embodiments, the market policy server 122 and the global policy server 123 may be implemented using a single server or multiple servers.

The device database 125 is configured to store authentication information regarding the users and the user devices (e.g., wireless device 110). The device database 125 may be a relational database that is accessible by the market policy server 122, global policy server 123, and API server 124. In various embodiments, the device database 125 is implemented in a computer system with a processor coupled to a non-transitory storage medium. The device database 125 may be updated periodically as the wireless network provider system 120 queries or receives updates from the account management system 130.

In various embodiments, the API server 124 is implemented as a computer system with a processor coupled to a non-transitory storage medium. In some embodiments, the API server 124 receives provisioning information from the account management system 130. Additionally or alternatively, the API server 124 receives a list of user's, their authentication information, and other settings. The API server 124 may process the received information, convert the information into instructions for the other devices in the wireless network provider system 120, and transmit the instructions to be processed and implemented by the base station 121, market policy server 122, global policy server 123, API server 124, and device database 125. The API server 124 receives requests from a wireless provisioning server 138 over the network 140. After receiving the request the API server 124 verifies that the request is valid and that appropriate permissions are provided with any data rate change request. The API server 124 updates the device database 125 according to the data rate change requests. The device database 125 is queried by the global policy server 123 for data rate changes. Upon receiving information about a data rate change, the global policy server 123 informs the market policy server 122, which in turn informs the base station 121 to communicate with the wireless device 110 at the user chosen data rate.

The data processing system 100 includes the network 140, which may comprise a local area network (LAN), a wide area network (WAN), a wired or wireless network, the Internet, or a combination thereof. The network 140 transfers data between a plurality of systems, such as but not limited to, the wireless device 110, the wireless network provider 120, the account management system 130, the computing device 150, and other systems.

The account management system 130 includes a plurality of computer systems and network connections. The account management system 130 includes an account management web server 132, a device queue 134, a device database 136, and the wireless provisioning sever 138. In one embodiment, the account management web server 132, the device queue 134, the device database 136, and the wireless provisioning sever 138 are implemented on a single unitary computer system. Alternatively, the account management web server 132, the device queue 134, the device database 136, and the wireless provisioning sever 138 can each be implemented on a plurality of connected computer systems. Additionally or alternatively, the account management web server 132, the device queue 134, the device database 136, and the wireless provisioning sever 138 can be remotely located (e.g. in different buildings or cities) from each other and receive power from different power outlets. In one embodiment, the account management web server 132 may be remotely located from the device queue 134, the device database 136, and the wireless provisioning sever 138. In some embodiments, the account management web server 132, the device queue 134, the device database 136, and the wireless provisioning sever 138 are connected through a proprietary wired system.

The account management web server 132 is a web server that provides account management controls to account administrators and to users, such as a user of the computing device 150 and the wireless device 110. In one embodiment, the account management web server 132 generates various web pages that allow the user to change upload and download data rates. In another embodiment, the account management web server 132 allows the wireless network provider to provide updates regarding wireless users to the account management system 130. In one embodiment, the account management web server 132 may query the device database 136 for a user's current wireless speed. After receiving the wireless speed information from the device database 136, the account management web server 132 may generate a response for a user's web browser request. The account management web server 132 may transmit data or a message to the user's web browser to generate an overlay that informs the user of a current wireless speed setting (e.g., download 1.0 Mbit/s, upload 384 Kbits/s).

The account management system 130 is configured to receive from a user of the wireless device 110 a change in their wireless or wired data transfer rate. The account management web server 132 is configured to generate a web page that allows a user to choose their download, upload, or download and upload speeds. If the account management web server 132 receives a change in the wireless speed from the user of the wireless device 110, the account management web server 132 inserts a change speed request into the device queue 134. The change speed request indicates to other computer systems that this request is to change the wireless data rate transfer speed. The change speed request includes the new data rate chosen by the user, and may also include user identifying information, wireless device identifying information (e.g., identifying information for the wireless device 110), an urgency indicator, and/or price change information. The account management web server 132 informs the user via their web browser that the data rate change request has been successful if the change in speed is completed. The web browser may be displayed to the user on the wireless device 110, the computing device 150, or another user device.

The device queue 134 can be implemented on a computer system with a processor and a non-transitory computer readable storage medium. The device queue 134 may include a prioritization algorithm where the request to change the data transfer rate is given a higher priority than other requests. In another embodiment, the device queue 134 may be a first in first out (FIFO) queue.

The device database 136 keeps track of the current device status and is updated once the request for the change in data speed is processed. The device database 136 also informs the account management web server 132 regarding the current data transfer rate of the user's wireless device 110.

The wireless provisioning server 138 can be implemented on a computer system with a processor and a non-transitory computer readable storage medium. The wireless provisioning server 138 may be configured to perform provisioning on a periodic basis, daily, hourly, or after a certain number of minutes. The wireless provisioning server 138 queries unprocessed requests for change in data speed from the device queue 134, and for each request the wireless provisioning server 138 performs any necessary actions before marking the request complete. In some embodiments, the functionality of the account management web server 132, the device queue 136, and the wireless provisioning server 138 is provided by a single server.

When a user requests a change in a wireless data transfer rate, the wireless provisioning server 138 requests that the API server 124 inform the base station 121 to transmit data at the rate chosen by the user. If the request by the wireless provisioning server 138 fails, then the wireless provisioning system 138 informs the user that the request cannot be processed, and the wireless provisioning server 138 moves on to a next request in the device queue 134. While the wireless provisioning server 138 is processing a request, the request is amended to indicate that the request is being processed. The wireless provisioning server 138 may be configured to check the status of all requests that are being processed each time it queries the device queue 134.

In some embodiments, the user is enabled to select web pages that may need higher data transfer rates. In these embodiments, the data transfer rate for loading the selected web page may be higher than for other web pages loaded to the user's wireless device 110. The user may be allowed to specify the data transfer rate for the selected web pages. Alternatively, the data processing system 100 may automatically determine the transfer rate for the selected web pages.

If the wireless provisioning server 138 receives an in progress data rate change request, the wireless provisioning server 138 contacts the wireless network provider API server 124 to request a status of the data rate change request. If the request has been completed, then the device database 136 is updated to reflect the changed data rate.

In some embodiments, the data transfer rate may be adjusted based on the location of the wireless device 110. For example, if the wireless device 110 is physically located in another wireless network provider's network, then the data transfer rate may be automatically updated to reflect the limitation of another wireless provider's network data transfer limitations. In another example, various areas in the coverage of the wireless network provider 120 may have different maximum data transfer rates. The data transfer rate of the wireless device 110 may be automatically adjusted based on the allowed data transfer rate when it is located in a particular area or zone.

The data transfer rate may vary by the type of connection that is available to the wireless device 110 at the moment. For example, when a Wi-MAX connection is used, a certain data transfer rate may be allowed, while a different data transfer rate may be allowed for another type of connection such as an LTE or 3G connection. The wireless device 110 could have different identifications for cellular and Wi-Fi networks. For example, the user could specify any data transfer speed when the wireless device is in a Wi-Fi network, but be limited to a certain speed when the wireless device is using a cellular network.

In other embodiments, when a predetermined amount of data (e.g., the first Gigabyte of data) is used by the wireless device 110 for data transfer purposes, the data transfer rate may be automatically updated (e.g., by the policy server 122 or 123) to a lower number. The user or the data processing system 100 may specify the predetermined amount of data. In another embodiment, the data transfer rate is automatically updated after a predetermined percentage of data allotment is used, or when a predetermined dollar amount is spent by the wireless account on the data transfer by the wireless device 110. The user or the data processing system 100 may specify the predetermined percentage of data allotment and the predetermined dollar amount.

In various embodiments, the data processing system 100 can track the transfer data rate by user, regardless of devices being used by the users. For example, two user devices belonging to a particular user may be sharing a data allotment. In this example, the data transfer speed on each of the two user devices may be adjusted depending on the data usage by the two user devices.

The data processing system 100 may implement one or more rewards mechanisms that would reward users for particular activities by increasing the user's data allotment. For example, the user may be rewarded for looking at advertisements or other types of web page content, referring other users to certain web pages, signing up for memberships on predetermined web pages, etc. The users may accumulate points, which can be redeemed for higher data transfer speeds.

An application may be installed on the user device (e.g., the wireless device 110, or the computing device 150), which would route all traffic to a mobile virtual network operator ("MVNO"). The MVNO would perform deep packet inspection and act as a proxy in processing the traffic.

Figure 1B:
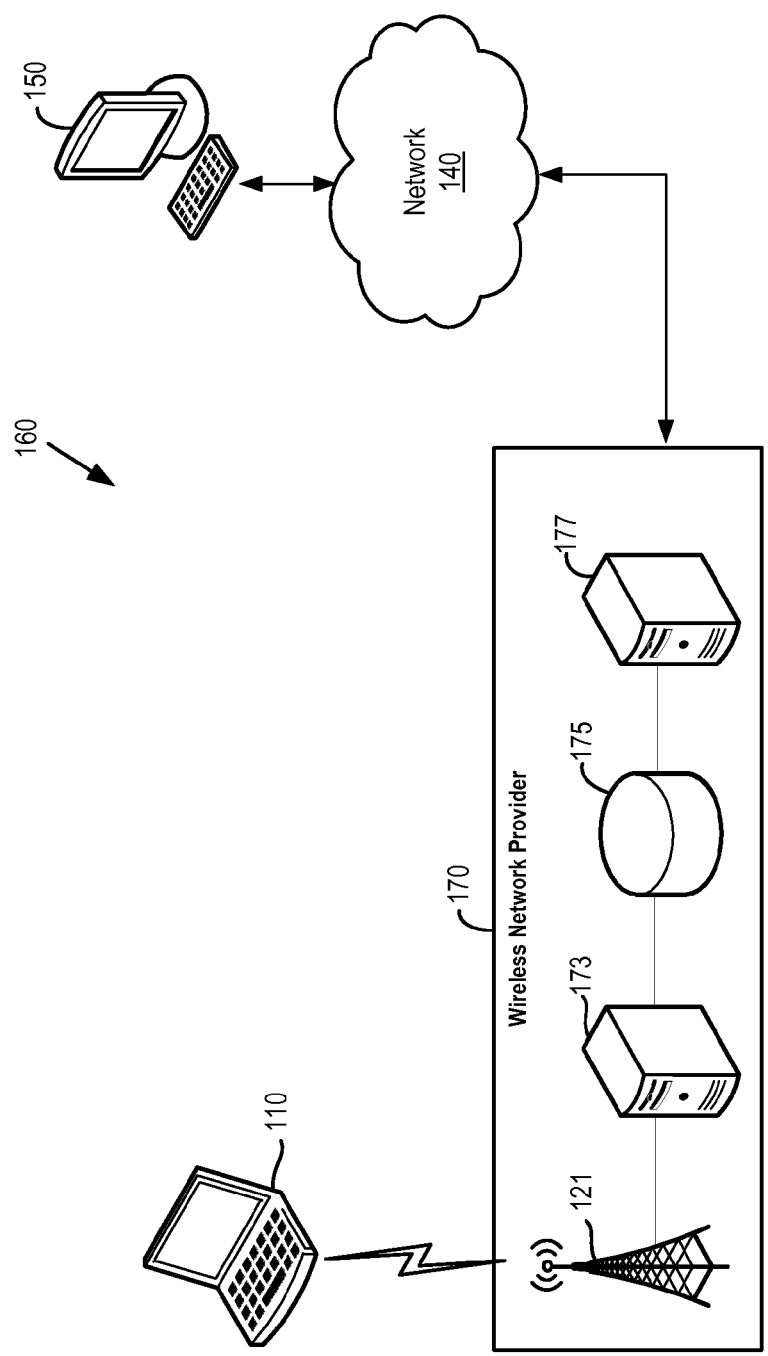
FIG. 1B is a schematic diagram of a computer-implemented data processing system according to another example embodiment.

FIG. 1B is a schematic diagram of a computer-implemented data processing system 160 according to another example embodiment. The data processing system 160 may include wireless device 110, network 140, computing device 150, and wireless network provider 170. The wireless network device 110, network 140, and computing device 150 may communicate with the wireless network provider 170 in a similar way as they communicate with the wireless network provider 120 as described above with respect to FIG. 1A. The wireless network provider 170 of FIG. 1B is configured to provide both the functionality of the wireless network provider 120 and the account management web server 132 of FIG. 1A.

With reference to FIGS. 1A and 1B, the wireless network provider 170 includes the base station 121, policy server 173, device database 175, and management server 177. The base station 121 performs and provides similar functionality as described above with respect to the base station 121 in FIG. 1A. The policy server 173 may be configured to perform the functions of the market policy server 122 and global policy server 123. In another embodiment, the device database 175 is configured to perform the functions of the device databases 125 and 136 and the device queue 134. The management server 177 performs the functions of the API server 124, account management server 132, and provisioning server 138. In other embodiments, the policy server 173 and management server 177 may be implemented as a single computer system. Alternatively, the policy server 173 and management server 177 may be implemented in a distributed computer system. In one embodiment, the device database 175 may be implemented in a distributed computer system or a single computer system. Both wireless device 110 and computer device 150 may be configured to access the policy server 173, device database 175, and management server 177 as discussed throughout this application with respect to market policy server 122, global policy server 123, API server 124, device database 125, account management web server 132, device queue 134, device database 136, and wireless provisioning server 138.

Figure 2:
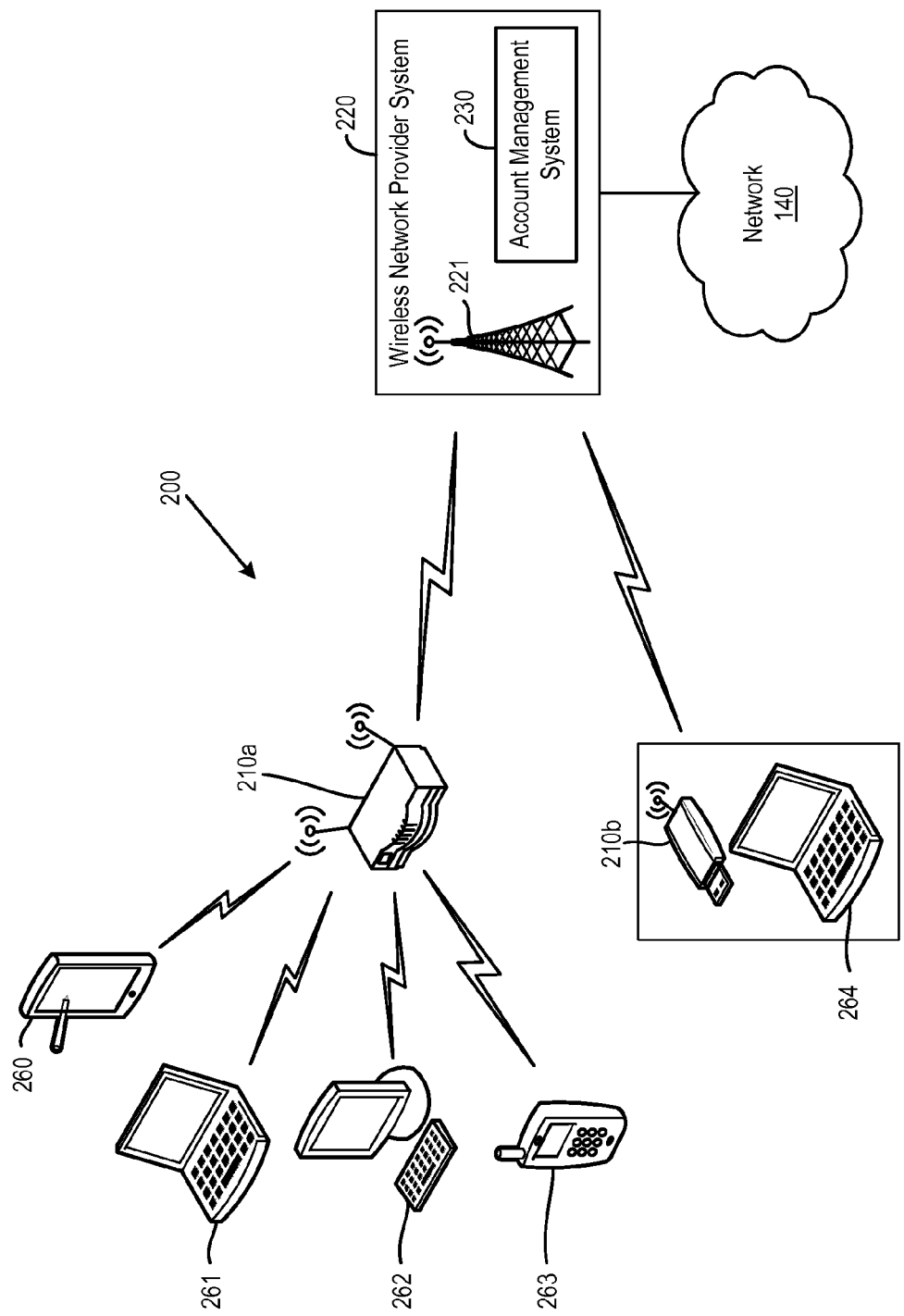
FIG. 2 is a schematic diagram of a computer-implemented data processing system according to an example embodiment.

FIG. 2 is a schematic diagram of a computer-implemented data processing system 200 according to an example embodiment. FIG. 2 shows another embodiment of the system shown in FIG. 1A. The system 200 includes various devices, each of which may include a processor that is in electrical communication with a non-transitory storage medium. The data processing system 200 includes a wireless network provider system 220, which includes a base station 221 and an account management system 230. The data processing system 200 also includes a wireless router 210*a* and/or a wireless USB device 210*b*. The data processing system 200 also includes a plurality of user devices 260, 261, 262, 263 and 264.

The wireless network provider system 220 may include each of the systems shown in the wireless network provider system 120 of FIG. 1A. For example, with reference to FIGS. 1A and 2, in various embodiments the wireless network provider system 220 includes base station 221, market policy server 122, global policy server 123, API server 124, and device database 125. The wireless network provider system 220 also includes the account management system 230, which includes each system and functionality shown in the account management system 130 of FIG. 1A. For example, the account management system 230 includes the account management web server 132, device queue 134, device database 136, and wireless provisioning server 138. In various implementations, the wireless network provider system provides the account management functionality, including but not limited to, providing the user with controls to throttle their wireless data speed. In some embodiments, the wireless network provider system is configured to provide the user with the ability to change their wireless speed without requiring any external computer systems. The wireless router 210*a* is configured to communicate with the base station 221. The wireless router 210*a* is designed with one or more antennas, which are capable of communicating with the user devices 260, 261, 262, and 263. Also shown in FIG. 2 is the wireless USB device 210*b* that may be connected to the user device 264, and the user device 264 may provide the power needed for the wireless USB device 210*b*. The wireless router 210*a* and the wireless USB device 210*b* are additional examples of wireless devices for which a wireless speed can be controlled using methods disclosed herein. In one example embodiment, the user device 260 is a tablet computer, the user device 261 is a laptop computer, the user device 262 is a desktop computer, and the user device 263 is a mobile telephone.

Figure 3A:
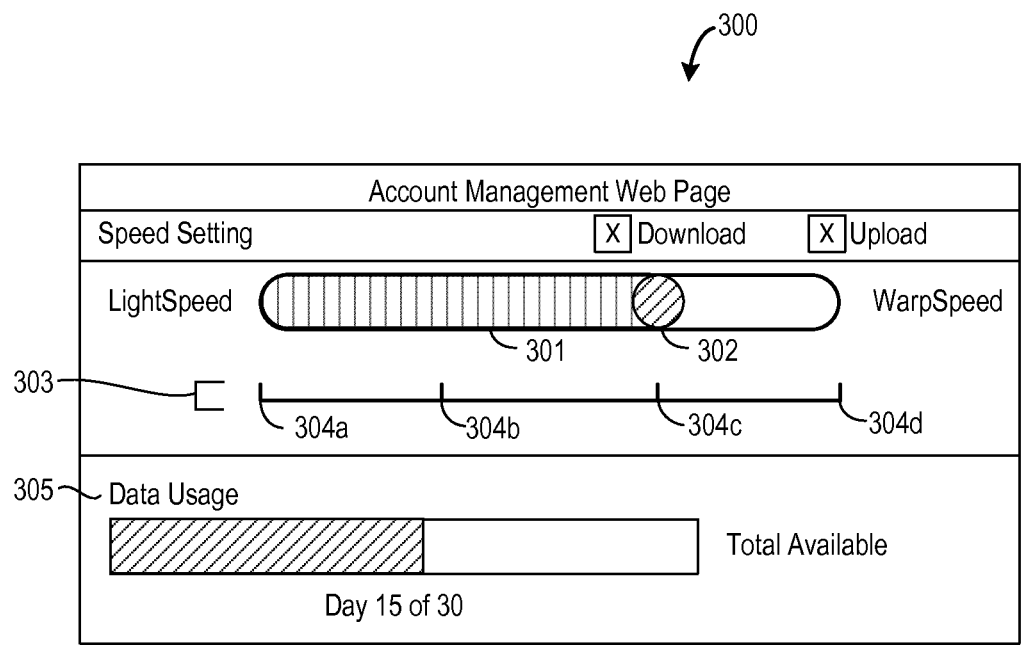
FIG. 3A is an example of a web page for selecting a wireless speed for a device.

FIG. 3A is an example of a screen shot of a web page 300. With reference to FIGS. 1A and 3A, the account management web server 132 generates the web page 300. The web page 300 allows the user to adjust a wireless speed for communications between the wireless device 110 and the base station 121. The web page 300 may be provided as an overlay or a pop-up window over another web page. A user using the computing device 150 and/or the wireless device 110 can view the web page 300. In other embodiments, another user interface may be provided to the user for changing the data transfer rate.

The web page 300 includes a slider 301, a scale 303, and a data usage indicator 305. The slider 301 includes a sliding element 302 that allows a user to move the sliding element 302 to select a desired wireless speed. In various other embodiments, other types of graphical user interfaces may be used in place of the slider 301 or in addition to the slider 301 and allow the user to provide keyboard, touch, verbal instructions, or pointing device input to change the wireless speed setting. Types of graphical user interfaces include, but are not limited to, toggles, buttons, checkboxes, radio buttons, list boxes, spinners, drop-down lists, menus, ribbons, combo boxes, text boxes, and/or the like. The user may use scale 303 to determine whether the user would like to choose a data transfer rate of a LightSpeed or a WarpSpeed or another rate between those speeds. In the embodiment shown in FIG. 3A, the user may select among speeds 304a, 304b, 304c and 304d. In some examples, the LightSpeed may represent a download speed of up to 1.0 Mbit/s, and an upload speed of up to 384 Kbit/s. In some examples, the WarpSpeed may represent a maximum download speed of 10 Mbit/s, and a maximum upload speed of 1.5 Mbit/s.

In various embodiments, the user may update the download speed and/or the upload speed associated with the data transfer rate. For example, the user may change the download speed, but leave the upload speed unchanged. In another example, the user may change the upload speed, but leave the download speed unchanged. In another example, the user may change both the upload speed and download speed at the same time. In the example shown in FIG. 3A, the download and upload speeds are updated in pairs by the user moving the sliding element 302 of the slider 301.

Although "LightSpeed" and "WarpSpeed" are displayed on the ends of the slider 301, another terminology may be used to indicate that the left side of the slider 301 indicates a lower speed, while the right side of the slider 301 indicates a higher speed (e.g., "Low Speed" and "High Speed").

Figure 3B:
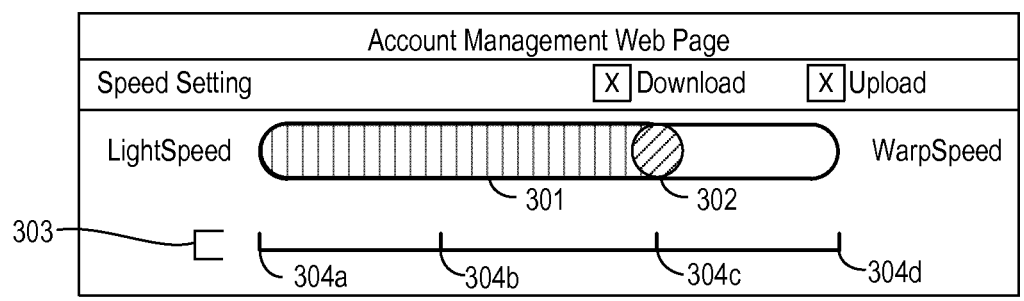
FIG. 3B is another example of a web page for selecting a wireless speed for a device.

FIG. 3B is an example of a screen shot of a web page 315. The web page 315 includes the scale 303 and the slider 301 with the sliding element 302 that allows a user to move the sliding element 302 to select a desired wireless speed. However, the web page 315 does not show the data usage. In such embodiments, the data usage may be shown on a different or separate web page from the web page 315. The user using the computing device 150 and/or the wireless device 110 of FIG. 1A can view the web page 315 and move the sliding element 302.

Figure 3C:
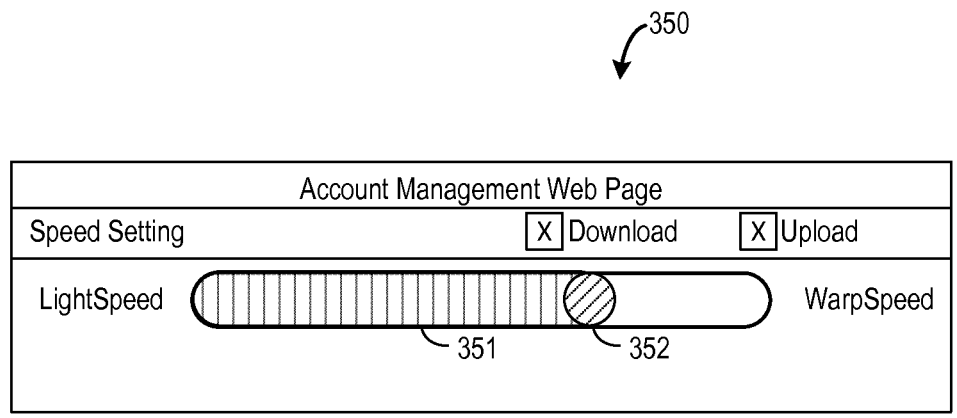
FIG. 3C is an example of a screen for selecting a wireless speed for a device.
Figure 4B:
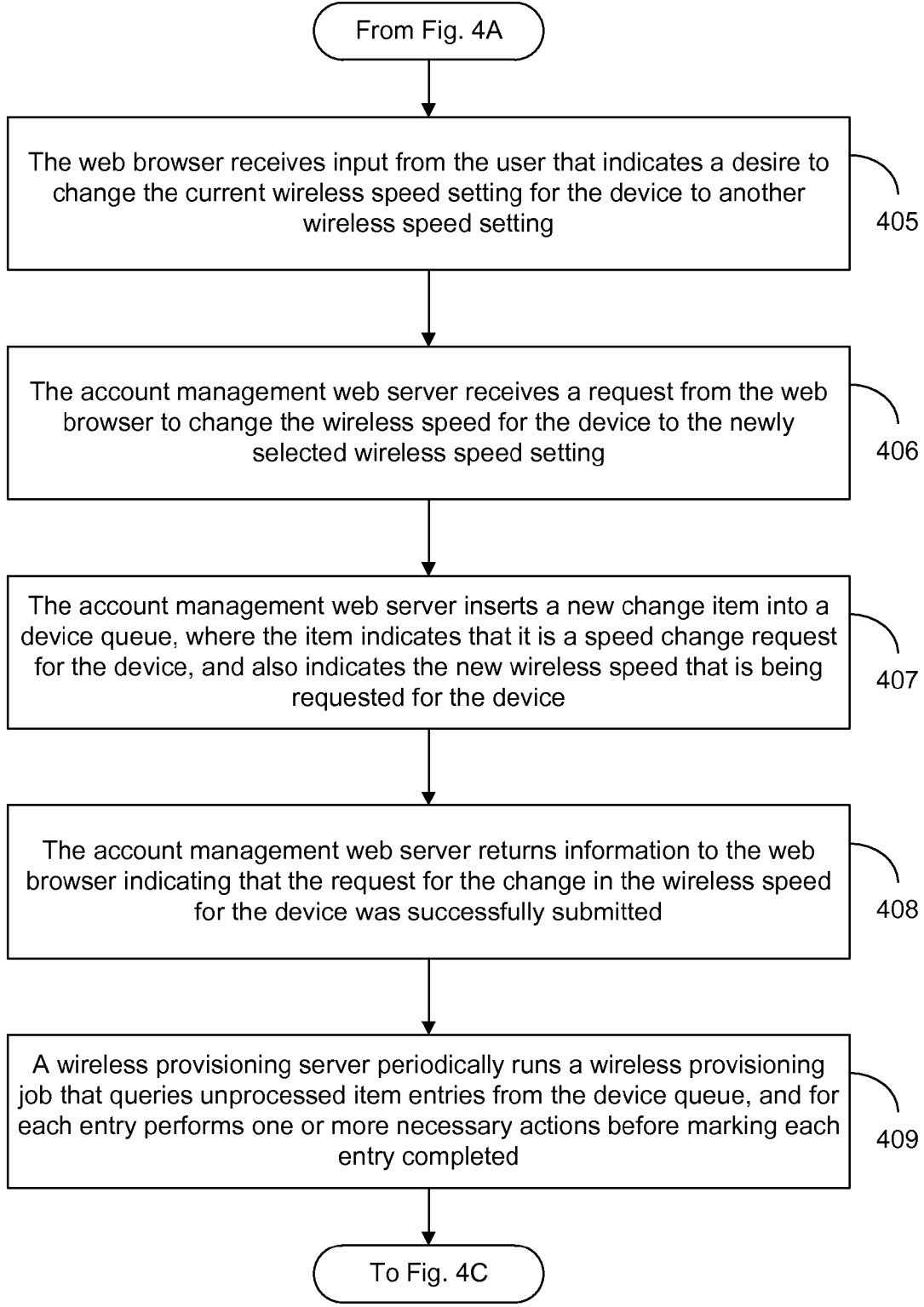
FIG. 4B continues the flowchart of FIG. 4A.
Figure 5A:
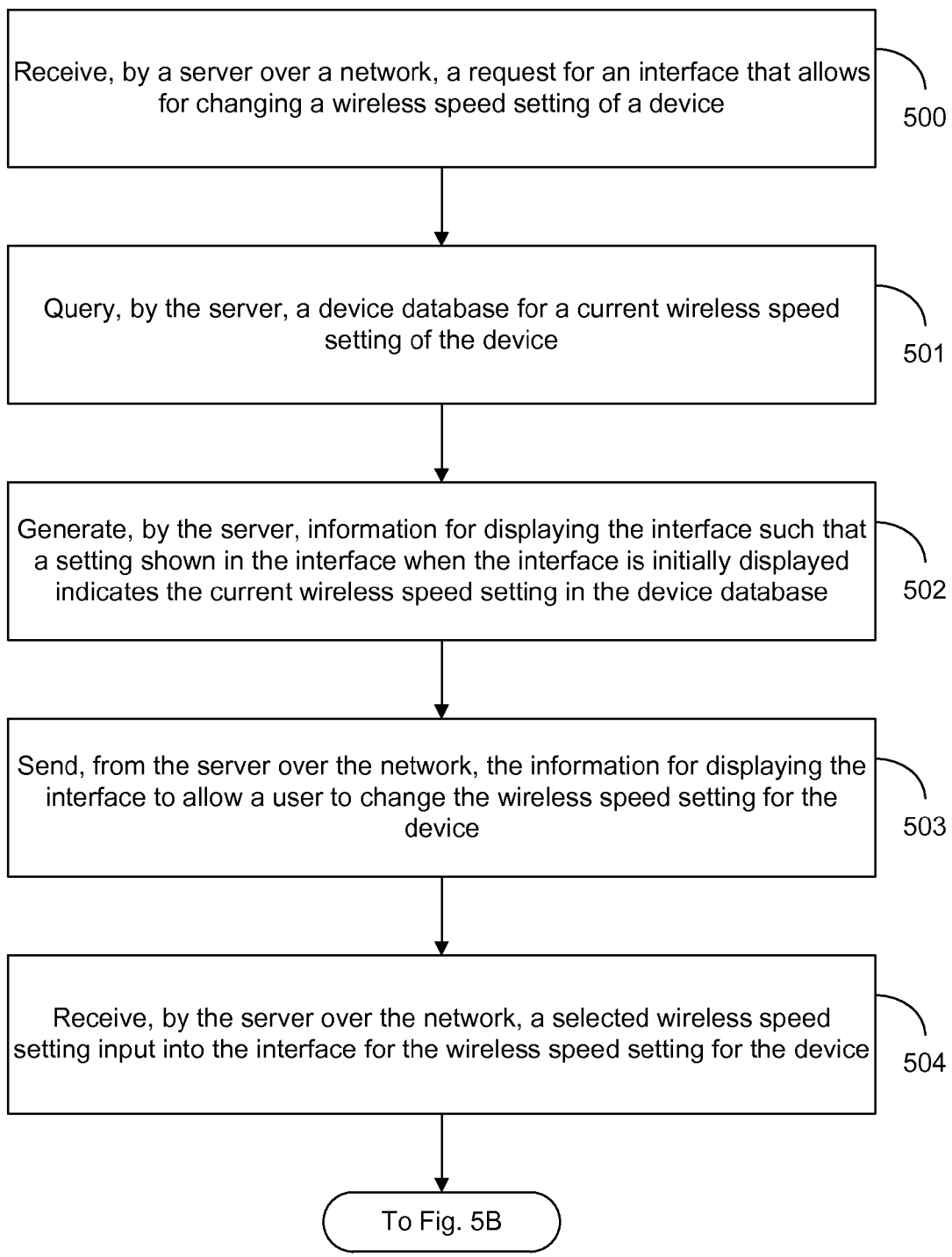
FIG. 5A illustrates a flowchart of a method for changing a wireless network speed for a device in accordance with an embodiment.

FIG. 3C is an example of a screen shot of a web page 350. The web page 315 includes a slider 351 with a sliding element 352 that allows a user to select a desired wireless speed. In some embodiments, the web page 350 does not show the data usage. In such embodiments, the data usage may be shown on a different or separate web page from the web page 350. The user using the computing device 150 and/or the wireless device 110 of FIG. 1A can view the web page 350 and move the sliding element 352. The sliding element 352 offers the user a choice to select any wireless speeds using the sliding element 352 that is variable. In some embodiments, the sliding element 352 is a continuously variable sliding element 352, where the user can choose any speed between and including the lowest and the highest speed.

With reference again to FIGS. 1A and 3A, when the user makes a selection on the web page 300, a web browser in which the web page 300 is displayed sends a selected value for the wireless speed to the account management web server 132 of the account management system 130. The account management system 130 requests that the wireless network provider 120 change a data transfer rate for communications between the wireless device 110 and the base station 121. In one example embodiment, the data usage indicator 305 shows an amount of the total data allotment that has been used by the user as of the latest data usage reported by the wireless network provider 120. With reference to FIGS. 1A and 3B, when the user makes a selection on the web page 315, a web browser that displayed the web page 315 sends a selected value for the wireless speed to the account management web server 132 of the account management system 130. The account management system 130 requests that the wireless network provider 120 change a data transfer rate for communications between the wireless device 110 and the base station 121.

Rather than throttling the speed on high data usage users, various embodiments give the users the ability to slow or increase their speed down themselves (e.g., as shown in FIGS. 3A-C). In various embodiments, there is a switch, input box, slider, menu, or other input mechanism, provided to users of wireless devices on a web page or a desktop application, enabling the users to switch between available wireless speeds. Adjusting the speed setting to a lower speed offers lower download and upload speeds to help preserve data usage. Adjusting the speed setting to a higher speed offers faster download and upload speeds but may use a data allowance at a faster rate.

In various embodiments, clicking on an icon, such as a LightSpeed or a WarpSpeed icon, allows for changing a wireless speed for a user's wireless device. By slowing the speed, a user can conserve data. For example, some websites can be very heavy (data intensive) to load, so the speed selector mechanism can help users protect/preserve their monthly allotment from such websites by selecting a low speed, because some of these websites use speed detection to determine how and/or what they will display to a wireless device for their web page. By slowing down a connection speed of a device (e.g., wireless device 110 of FIG. 1A or devices 260-264 of FIG. 2), visited sites may change an experience to cater to that connection speed. For example, by slowing down the wireless speed of the connection, a website may only show a standard definition video and not a 1080p High Definition video, where the standard definition video will consume less data than a high definition version of the video.

FIGS. 4A, 4B, 4C, and 4D illustrate a flowchart of a method for changing a wireless network speed for a user's wireless device (e.g., wireless device 110 of FIG. 1A), in accordance with an illustrative embodiment. With reference to FIGS. 1A, 3A, 3B, 3C, 4A, 4B, 4C, and 4D, in step 400 a web browser running on a computing device, such as the computing device 150, is used to access an account management website. For example, an account management website may be hosted on the account management web server 132, and the user may open the web browser on the computing device 150 and access the account management website over the network 140. In various embodiments, the user can access the account management website while connected via a wireless or wired connection of any type. In step 401, the web browser receives input from the user to allow the user to log into the account management website with user identifying information (e.g., a username and a password).

In step 402, the web browser receives input that selects a connection speed link on an account web page of the account management website. For example, the user could select or input the connection speed link on the account page. In step 403, the account management web server 132 that hosts the account management website queries the device database 136 for a current wireless speed setting of the wireless device 110 associated with the user. In step 404, the account management web server 132 generates a response back to the web browser on the computing device 150 such that a setting in an overlay or web page, such as the web page 300, displayed by the web browser shows the current wireless speed setting for the wireless device 110. The overlay may provide, for example, the screen layout as shown in FIG. 3A, 3B, or 3C for adjusting the wireless speed setting of the wireless device 110.

In step 405, the web browser running on the computing device 150 receives input from the user that indicates a desire to change the current wireless speed setting for the wireless device 110 to another wireless speed setting. For example, the wireless speed setting may be changed from LightSpeed to WarpSpeed using the sliding element 302 of the slider 301 on the web page 300. In step 406, the account management web server 132 receives a request from the web browser to change the wireless speed for the wireless device 110 to the newly selected wireless speed setting. In step 407, the account management web server 132 inserts a new change item into the device queue 134, where the item indicates that it is a speed change request for the wireless device 110, and also indicates the new wireless speed that is being requested for the wireless device 110. In step 408, the account management web server 132 returns information to the web browser indicating that the request for the change in the wireless speed for the wireless device 110 was successfully submitted.

In step 409, the wireless provisioning server 138 periodically runs a wireless provisioning job that queries unprocessed item entries from the device queue 134, and for each entry performs one or more necessary actions before marking the entry completed. The wireless provisioning job may run, for example, every N minutes on the wireless provisioning server 138, where "N" is a preset value. In step 410, the wireless provisioning job running on the wireless provisioning server 138 picks up, from the device queue 134, the newly added item requesting the wireless speed change for the wireless device 110. In step 411, the wireless provisioning job contacts the API server 124 of the wireless network provider 120 over the network 140, and requests that an offer that the wireless device 110 is currently provisioned for be changed to an offer that has the newly requested wireless speed setting.

In step 412, it is determined by the wireless provisioning job running on the wireless provisioning server 138 whether the sending of the request to the API server 124 failed or succeeded. If it is determined in step 412 that the request failed, then in step 413 the wireless provisioning job goes to the next unprocessed item in the device queue 134. If it is determined in step 412 that the request succeeded, then in step 414 the wireless provisioning job marks the item as "in progress" in the device queue 134.

In step 415, the API servers, such as the API server 124, of the wireless network provider 120 take requests coming in from partners' wireless provisioning servers, such as the wireless provisioning server 138, and make the requested changes (after doing validity/permissions checks) in the device database 125 of the wireless network provider 120. In step 416, one or more global policy servers, such as the global policy server 123 of the wireless network provider 120, update device information and the associated offer and its settings (including the wireless speed setting) for the wireless device 110 based on information from the device database 125. In step 417, the one or more global policy servers, such as the global policy server 123, replicate policy information (including the wireless speed setting) for the wireless device 110 to one or more per-market/wireless-area policy servers, such as the market policy server 122, such that the user's change to the wireless speed setting for the wireless device 110 is put into effect. Then, when the wireless device 110 is used by the user to communicate with the base station 121, the new wireless speed settings are used to dictate the download and upload speeds.

In step 418, the wireless provisioning job running on the wireless provisioning server 138 checks all "in progress" items each time it queries the device queue 134, and when it gets to the wireless speed change request that is marked "in progress" it contacts the API server 124 of the wireless network provider 120 and requests the status of the requested change. If the returned status indicates that the request is not complete, then the wireless provisioning job skips to the next not fully processed entry from the device queue 134. In step 419, if the returned status to the wireless provisioning job from the API server 124 indicates that the request has been completed, then the wireless provisioning job marks the item "completed" in the device queue 134. The account management web server 132 may then send a notification to the computing device 150 to notify the user that the change has been successfully completed.

FIGS. 5A, 5B, 5C, and 5D illustrate a flowchart of a method for changing a wireless network speed for a user's wireless device in accordance with an embodiment. With reference to FIGS. 1A, 3A, 3B, 3C, 5A, 5B, 5C, and 5D, in step 500 a server, such as the account management web server 132, receives over a network, such as the network 140, a request for an interface, such as the web page 300, that allows for changing a wireless speed setting of a wireless device, such as the device 110. In step 501 the server queries a device database, such as the device database 136, for a current wireless speed setting of the wireless device. In step 502, the server generates information for displaying the interface, such that a setting shown in the interface when the interface is initially displayed indicates the current wireless speed setting obtained from the device database. In step 503, the server sends over the network the information for displaying the interface to allow a user to change the wireless speed setting for the wireless device.

In various embodiments, the server sends the information for displaying the interface over the network to a web browser when the web browser requests a web page with the interface from an account management website hosted by the server. Also, in various embodiments, the server allows a user to log into the account management website using a username and password. In some embodiments, the web browser runs on an end user computer that connects to the network using either a wireless or a wired connection. In some embodiments, the web browser runs on the wireless device for which the speed setting is to take effect.

In various embodiments, the account management website allows for a user to view data usage for the wireless device, and to view a billing history for usage of the wireless device, and to manage a user profile. In some embodiments, the web browser accesses the interface when a link identifying the web page with the interface is selected in the web browser. Also, in some embodiments, the interface allows a user to change the wireless speed setting for the wireless device and to request the server to save the change of the wireless speed setting.

In various embodiments, the interface displays two or more possible wireless speed settings for the wireless device for selection by a user. Also, in various embodiments, the interface provides a slider or other user interface (i.e., radio buttons, toggle, drop-down list, link, text box, and/or the like) for changing between at least two different possible settings for the wireless speed setting for the wireless device. In some embodiments, an initial wireless speed setting is provided as a default setting in the interface and is determined based on a wireless data plan purchased for the wireless device. Also, in some embodiments, if the wireless data plan is subsequently upgraded or downgraded to a new wireless data plan, the wireless speed setting for the wireless device is changed to a wireless speed setting specified for the new wireless data plan regardless of an existing setting for the wireless speed setting.

In various embodiments, the wireless speed setting for the wireless device is changeable at any time and is changeable any number of times. In some embodiments, the interface allows for changing the wireless speed setting for the wireless device to a setting that limits a download speed and an upload speed of a wireless connection between the wireless device and a base station. Also, in some embodiments, the interface allows for changing the wireless speed setting for the wireless device to a setting in which a download speed and an upload speed of a wireless connection between the wireless device and a base station are limited only by wireless network provider factors, location factors, and environmental factors at a current location of the wireless device.

In step 504 the server receives over the network a selected wireless speed setting input into the interface for the wireless speed setting for the wireless device. The method may then include sending, to a computer of a wireless network provider, a request to change the wireless speed setting for the wireless device to the selected wireless speed setting received by the server. The sending may be initiated and performed, for example, as described in some of the following steps. In step 505, the server inserts into a device queue, such as the device queue 134 an item that indicates a speed change request and a requested speed specified by the selected wireless speed setting. In step 506 the server returns to the web browser a web page indicating a successful saving of a change of the wireless speed setting after the inserting of the item into the device queue.

In step 507, a wireless provisioning job periodically runs on a wireless provisioning server, such as the wireless provisioning server 138, to query for unprocessed items that have been entered into the device queue. In step 508, the wireless provisioning job running on the wireless provisioning server performs, for each item of the unprocessed items, one or more actions for the item and marks an entry corresponding to the item to specify completion once all actions for the item have been performed. In step 509, the wireless provisioning server contacts, upon picking up an item from the device queue requesting a speed change for the wireless device, the computer of the wireless network provider to request that an offer the device is currently provisioned with be changed to another offer that has the newly requested wireless speed setting.

In various embodiments, the computer of the wireless network provider is an API server, such as the API server 124. In some embodiments, each offer of a plurality of offers supported by the wireless network provider has attributes including a maximum upload speed and a maximum download speed. Also, in some embodiments, each offer has an associated identification number for specifying a request for the offer.

In step 510 the wireless provisioning server processes a next unprocessed item in the device queue if the contacting of the computer of the wireless network provider results in a failure. In step 511, the wireless provisioning server marks, in the device queue, the item as being "in progress" if the contacting of the computer of the wireless network provider succeeds. In step 512, the computer of the wireless network provider receives the request to change the wireless speed setting for the wireless device to the selected wireless speed setting. In step 513, the computer of the wireless network provider checks whether the selected wireless speed setting satisfies one or more validity or permissions checks. In various embodiments, the computer of the wireless network provider changes the wireless speed setting of the wireless device to the selected wireless speed setting if the one or more validity or permissions checks are satisfied.

In step 514, a change is made in a device database, such as the device database 125 of the wireless network provider 120, to change the wireless speed setting for the wireless device to the selected wireless speed setting if the request for the selected wireless speed setting satisfies the one or more validity or permissions checks. In step 515, a policy for the device is updated in a global policy server, such as the global policy server 123, based on information associated with the wireless device in the device database of the wireless network provider. In step 516, the policy for the device from the global policy server is replicated to one or more pre-market or wireless area policy servers, such as the market policy server 122, to put into effect the change of the wireless speed setting for the wireless device. Communications between the device and a base station, such as the base station 121, of the wireless network provider are then governed by the newly set wireless speed setting.

In step 517, the wireless provisioning server periodically checks for items marked as "in progress" in the device queue. In step 518, the wireless provisioning server contacts, for each of the items marked as "in progress" in the device queue, the computer of the wireless network provider to request a status for the requested speed change specified by the item. In step 519, the wireless provisioning server marks, for each item in the device queue, the item as completed after the changes specified by the item have been completed. The user may be notified of a successful change in the wireless speed setting once the wireless network provider has completed the change to the wireless speed setting for the wireless device.

A non-transitory computer-readable storage medium in accordance with an embodiment stores one or more computer programs that when executed on one or more computers cause the one or more computers to perform a process. In various embodiments, the process includes (i) sending, over a network, information for displaying an interface to allow a user to change a wireless speed setting for a device; (ii) receiving, over the network, a selected wireless speed setting input into the interface for the wireless speed setting for the device; and (iii) sending, to a computer of a wireless network provider, a request to change the wireless speed setting for the device to the selected wireless speed setting received over the network.

A system in accordance with an embodiment includes a server. In various embodiments the server is configured to (i) send, over a network, information for displaying an interface to allow a user to change a wireless speed setting for a device; (ii) receive, over the network, a selected wireless speed setting input into the interface for the wireless speed setting for the device; and (iii) send, to a computer of a wireless network provider, a request to change the wireless speed setting for the device to the selected wireless speed setting received by the server.

Figure 6:
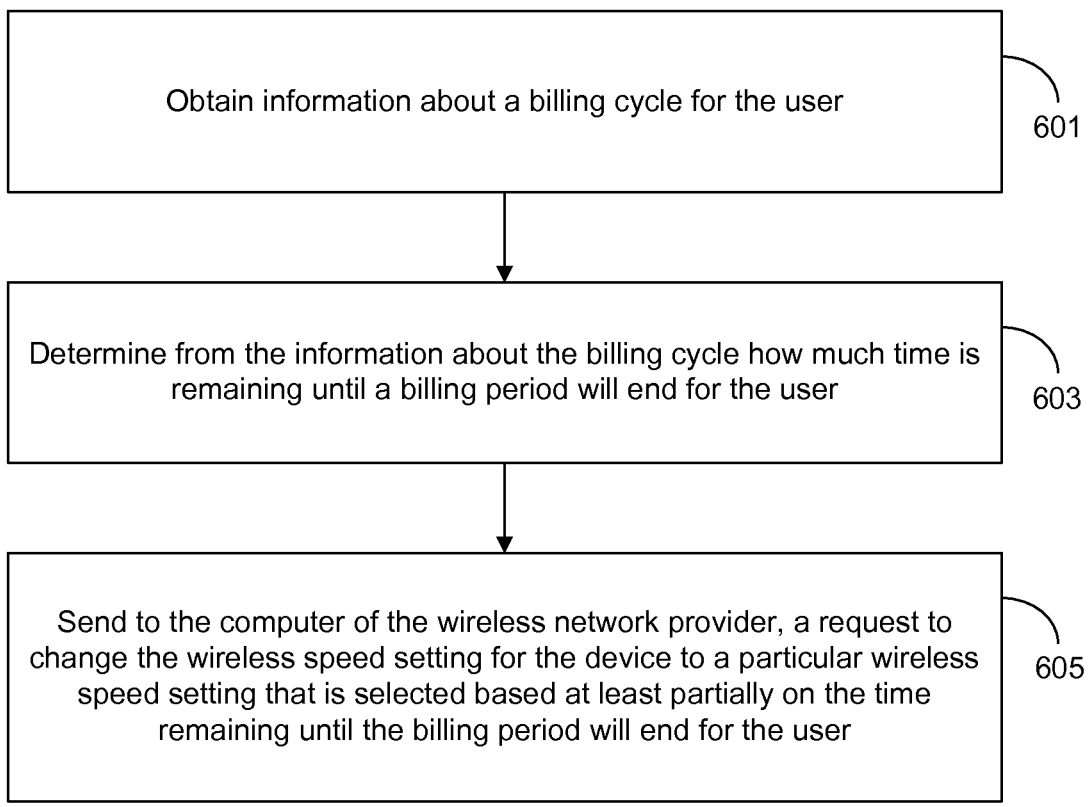
FIG. 6 illustrates a flowchart of a method for changing a wireless network speed for a device based on a billing cycle for a user in accordance with an embodiment.

FIG. 6 illustrates a flowchart of a method for changing the wireless network speed for a user's wireless device based on a billing cycle in accordance with an embodiment. With reference to FIGS. 1A and 6, in step 601, one or more servers of the account management system 130, such as the account management web server 132 or the wireless provisioning server 138, obtain information about a billing cycle for the user. The billing cycle for the user may be periodic such that the user is billed after a predetermined period of time and the data usage allotment is reset to zero at the beginning of a billing cycle. For example, a billing cycle may be monthly, bimonthly, weekly, or daily. In one embodiment, where the billing cycle is monthly the user may be granted a certain amount data usage for the month and at the end of the month the data usage is reset to zero and the user may be required to make a payment. In another embodiment, the monthly billing cycle may not end or begin at the end of a month, instead, the billing cycle may end or begin at a previously agreed upon date in the month. In other embodiments, the billing cycle may be a certain number of days long (i.e. 20, 25, 28, or 38 days long). In other embodiments, the billing cycle may be various other numbers of days long.

In step 603, one or more servers of the account management system 130, such as the account management web server 132 or the wireless provisioning server 138, determine from the information about the billing cycle how much time is remaining until a billing period will end for the user. The one or more servers may determine the current date and determine based on the agreement with the customer the total number of days between the current date and the end of the billing cycle. The one or more servers may also be configured to determine the average amount of data used on a daily basis during the last billing cycle. For example, if the user used 200 Megabytes in the last 20 days of the current billing cycle, then the user used an average of 20 Megabytes per day. The user may have 10 days remaining in the billing cycle with an allotment of 300 Megabytes total. In this example, the user has 100 Megabytes remaining in the billing cycle allotment with 10 days left in the billing cycle. In this example, the user's data usage average on a per day basis needs to change to 10 Megabytes per day. One way of changing the user's data usage would be to slow the user's data usage by changing the wireless speed setting.

At step 605, a server of the account management system 130, such as the account management web server 132 or the wireless provisioning server 138, send to the API server 124 of the wireless network provider 120 a request to change the wireless speed setting for the wireless device 110 to a particular wireless speed setting that is selected based at least partially on the time remaining until the billing period will end for the user and/or the remaining wireless allotment. The wireless network provider 120 may then adjust the wireless speed setting for the device as discussed above in the embodiments of FIGS. 4A-4D and 5A-5D. In one embodiment, the account management system 130 may initially request the wireless network provider 120 to change the user's speed to be half of the user's speed prior to changing the user's speed based on the time remaining until the billing period ends. In the next day the account management system 130 may determine the user's data usage after initiating a change in speed. In one embodiment, if the user's data usage is greater than the calculated average per day usage for the remainder of the billing period, then the account management system 130 may request the wireless network provider 120 to reduce the wireless speed setting again. The account management system 130 may continue requesting the wireless network provider 120 to reduce the wireless speed setting until the user's data usage is equal to or less than the calculated usage per day to not go over the data usage allotment for the billing period. Alternatively, the account management system 130 may request the wireless network provider 120 to increase the wireless speed setting incrementally when the data usage on a daily basis is below the calculated average for each day based on the total allotment for the billing period.

Figure 7:
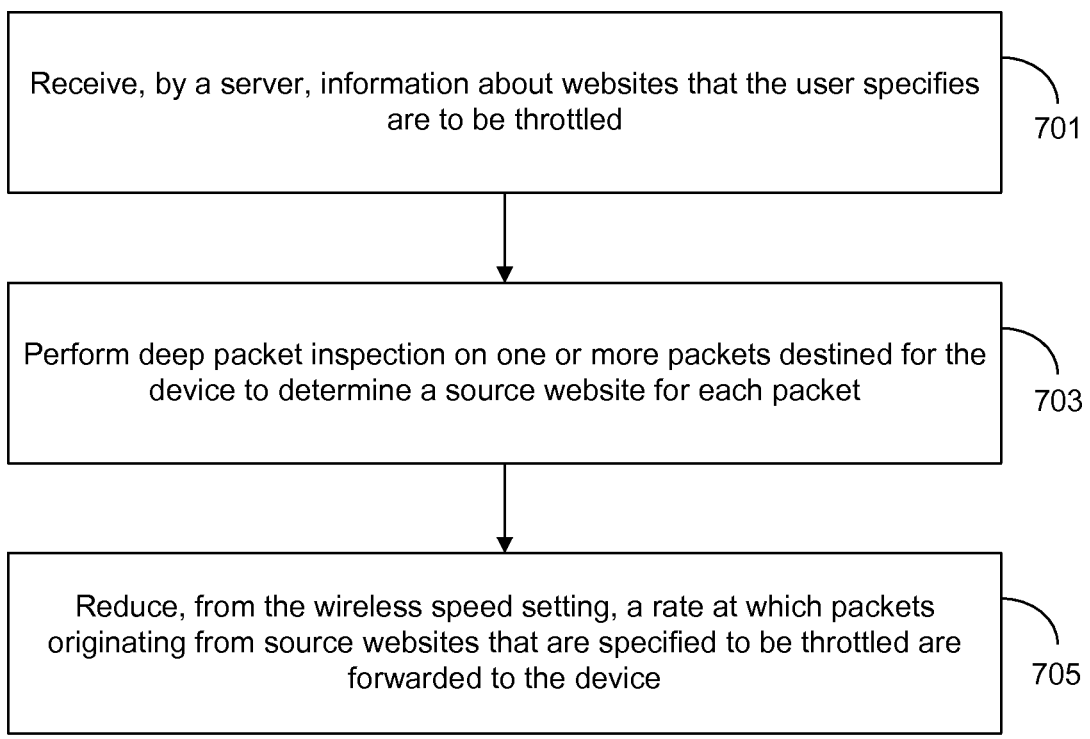
FIG. 7 illustrates a flowchart of a method for changing a wireless network speed for a device based on a source of packets in accordance with an embodiment.

FIG. 7 illustrates a flowchart of a method for changing a wireless network speed for a device based on a source website that is sending packets to the device in accordance with an embodiment. With reference to FIGS. 1A and 7, in step 701, a server, such as the account management web server 132, receives information about websites that the user has specified are to be throttled. The account management web server 132 may then provide information about the websites that are to be throttled for the user to the API server 124 of the wireless network provider 120. In an example embodiment, the user may specify that the wireless speed for certain websites (URLs) should be lower than the wireless speed for other websites. In some embodiments, the wireless speed may be lower for websites that are known to use a large amount of data. For example, websites that stream audio or video may use a large amount of data and, thus, when using wireless connections with a base station the speed of the download may be throttled to reduce data usage. In the above example, the video or audio streaming website may be configured to determine the speed of the wireless connection with the user device and provide a lower resolution data stream to the user based on the wireless connection speed.

In step 703, a server of the wireless network provider 120, such as the API server 124, performs deep packet inspection on one or more packets destined for the wireless device 110 to determine a source website for each packet. One example of deep packet inspection may include determining the provider of the packet. In order to determine the packet provider, the header of the packet may be analyzed to ascertain an Internet Protocol (IP) address. In some embodiments, a Doman Name Server (DNS) service may determine the URL that is assigned to the determined IP address. In step 705, the wireless speed setting may be reduced to reduce a rate at which packets originating from source websites that are to be throttled are forwarded to the wireless device 110. For example, API server 124 may control the base station 121 to reduce the wireless speed setting at which data is transmitted to the wireless device 110.

Figure 8:
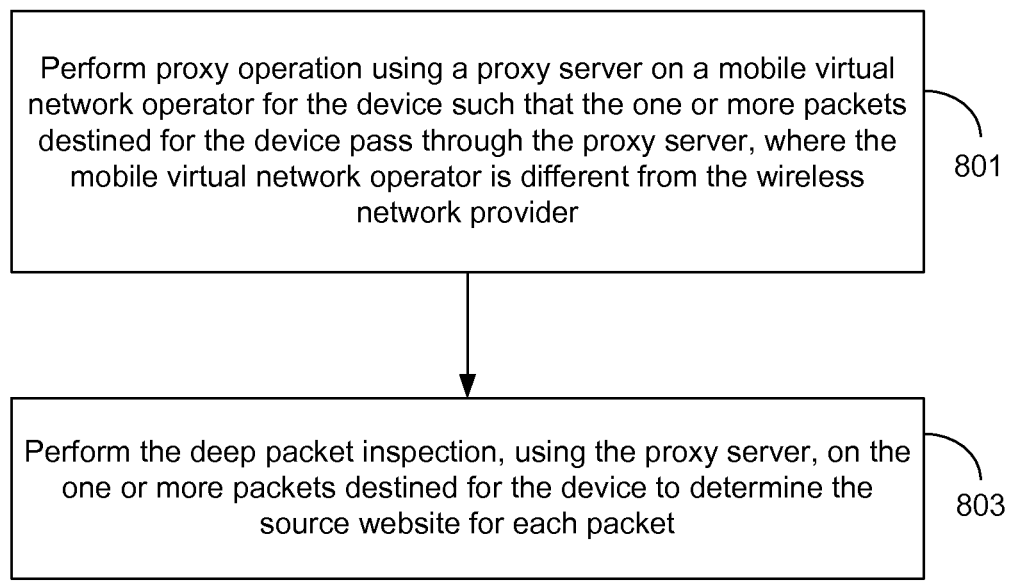
FIG. 8 illustrates a flowchart of a method for determining a source website for packets using a proxy server of a mobile virtual network operator in accordance with an embodiment.

FIG. 8 illustrates a flowchart of a method for performing deep packet inspection using a proxy server of a mobile virtual network operator in accordance with an embodiment. With reference to FIGS. 1A and 8, in step 801, a proxy server of a mobile virtual network operator, which may be a proxy server of the account management system 130, performs proxy operations for the wireless device 110 such that one or more packets destined for the wireless device 110 pass through the proxy server. The mobile virtual network operator is different from the wireless network provider 120. In step 803, the proxy server performs deep packet inspection on the one or more packets destined for the wireless device 110 to determine the source website for each packet. In one embodiment, the proxy server may send a request to the wireless network provider 120 to control the wireless speed of the wireless device 110 by informing the base station 121 to reduce the speed for packets from certain source websites.

Figure 9:
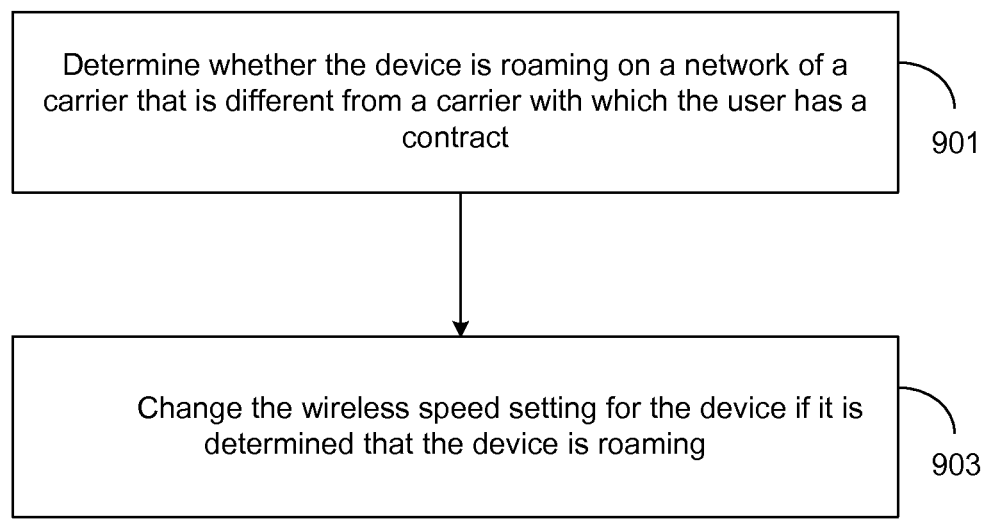
FIG. 9 illustrates a flowchart of a method for changing a wireless network speed for a device based on a roaming status of the device in accordance with an embodiment.

FIG. 9 illustrates a flowchart of a method for changing a wireless network speed based on a roaming status of a wireless device in accordance with an embodiment. With reference to FIGS. 1A and 9, in step 901, it is determined whether the wireless device 110 is roaming on a network of a carrier that is different from a carrier with which the user has a contract. In one embodiment, the wireless device 110 may be informed that it is roaming. In other embodiments, the wireless device 110 may determine that it is roaming and inform the wireless network provider 120 or the account management system 130 that it is roaming. In some embodiments, the wireless network provider 120 or the account management system 130 may be informed by another carrier to which the wireless device 110 is connected that the wireless device 110 is roaming. In step 903, a computer or other device of the wireless network provider 120 or the account management system 130 may request the carrier to which the wireless device 110 is connected to the change the wireless speed setting for the wireless device 110 upon determining that the wireless device 110 is roaming. While the wireless device 110 is connected to a roaming network, the user may incur additional charges and may want to minimize the additional charges. In some embodiments, the wireless speed setting for the wireless device 110 while it is roaming may be changed to be lower than the wireless speed of the wireless device 110 while the device is not roaming or connected to its home network or contracted network.

In other embodiments, the wireless speed setting for the wireless device 110 is set to be higher when the type of wireless technology used for a wireless connection is Wi-Fi than when the type of wireless technology used for the wireless connection is cellular. In some embodiments, a type of wireless technology that the wireless device 110 is using for a wireless connection may be determined. The wireless speed setting for the wireless device 110 may then be set based at least partially on the type of wireless technology that the wireless device 110 is using for the wireless connection. In various embodiments, an amount of data usage by the wireless device 110 is monitored within a billing cycle, and a request is sent from a computer of the account management system 130 to a computer of the wireless network provider 120 to change the wireless speed setting for the wireless device 110 to a particular wireless speed setting that is selected based at least partially on the amount of data that has been used by the device within the billing cycle.

In some embodiments, the account management web server 132 or other device rewards the user with points based upon completion of one or more predefined actions by the user. The account management web server 132 may then allow the user to redeem the points to increase the wireless speed setting for the wireless device 110. In some embodiments, the account management web server 132 may allow the user to use the points to increase a wireless speed setting of another device of another user. For example, the account management web server 132 may receive a request from a user to redeem points to increase a wireless speed of a device, and the account management web server 132 may then send a request to the API server 124 of the wireless network provider 120 to have the wireless network provider 120 increase the wireless speed setting for the device.

Figure 10:
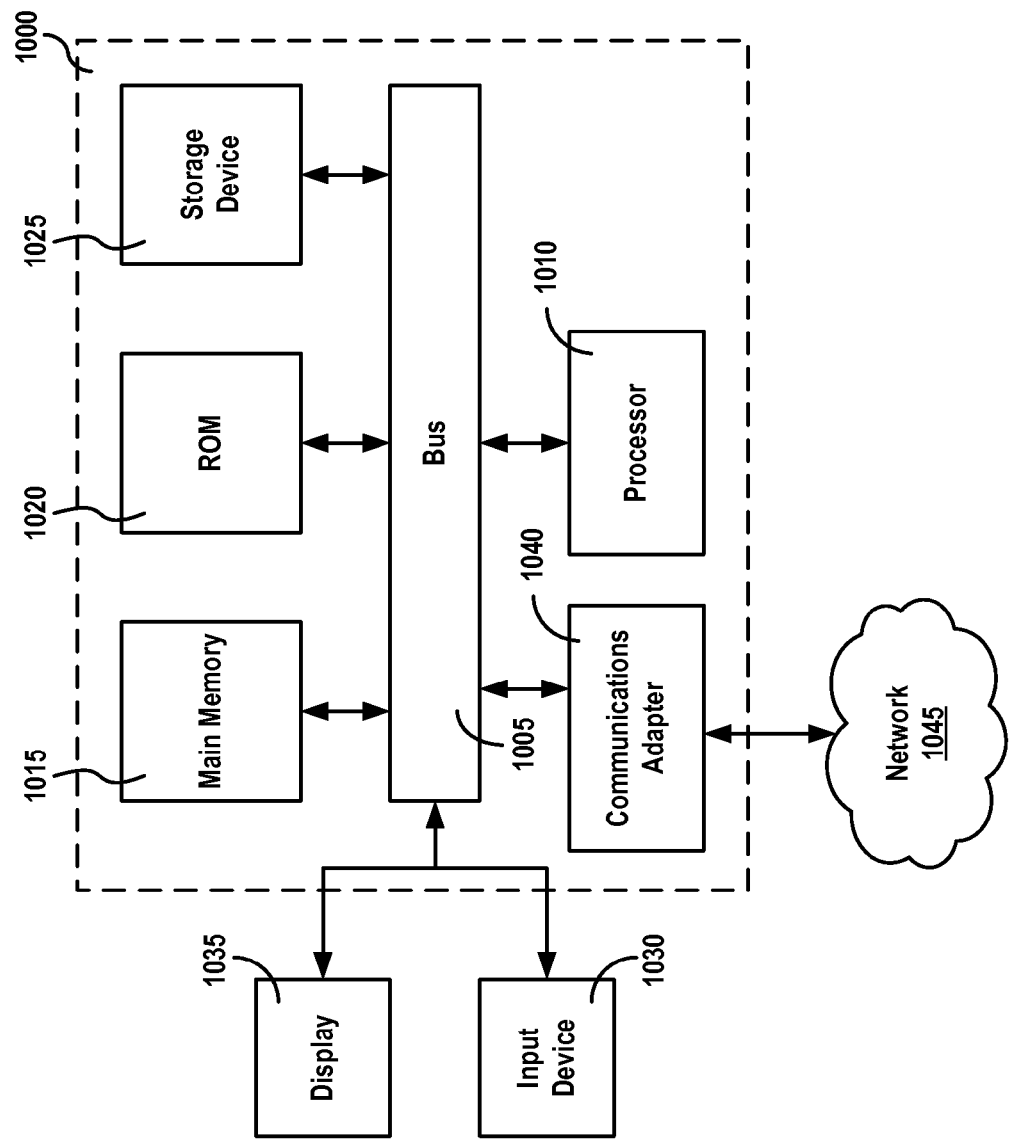
FIG. 10 is a block diagram of an example computing system in accordance with an embodiment.

FIG. 10 illustrates a depiction of an example computing system 1000. With reference to FIGS. 1A and 10, the computer system 1000 can be programmed, for example, to implement an illustrative wireless device 110, an illustrative market policy server 122, an illustrative global policy server 123, an illustrative API server 124, an illustrative device database 125, an illustrative account management web server 132, an illustrative device queue 134, an illustrative device database 136, an illustrative wireless provisioning server 138, an illustrative computing device 150, and/or various other illustrative systems that may be used in implementations as described in the present disclosure.

The computing system 1000 includes a bus 1005 or other communication component for communicating information, and a processor 1010 coupled to the bus 1005 for processing information. The computing system 1000 also includes main memory 1015, such as a random access memory (RAM) or other dynamic storage device, coupled to the bus 1005 for storing information and instructions to be executed by the processor 1010. Main memory 1015 can also be used for storing position information, temporary variables, or other intermediate information during execution of instructions by the processor 1010. The computing system 1000 may further include a read only memory (ROM) 1020 or other static storage device coupled to the bus 1005 for storing static information and instructions for the processor 1010. A storage device 1025, such as a non-transitory, solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information and command selections to the processor 1010. In another implementation, the input device 1030 includes a touch screen display. The input device 1030 can also include a cursor control, such as a mouse, a trackball, or cursor direction keys, for communicating direction information and command selections to the processor 1010 and for controlling cursor movement on the display 1035.

In some implementations, the computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet), wireless (e.g., via Wi-Fi, Bluetooth, WiMAX, 4G, LTE, etc.), pre-configured, ad-hoc, LAN, WAN, etc.

According to various implementations, various processes that effectuate illustrative implementations can be achieved using computing systems, such as the computing system 1000. The processor 1010 can execute an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform processes. One or more processors in a multi-processing arrangement may also be employed to execute the instructions contained in main memory 1015. In alternative implementations, hard-wired circuitry may be used in place of or in combination with software instructions to implement illustrative implementations. Thus, implementations are not limited to any specific combination of hardware circuitry and software.

Although an example processing system has been described in FIG. 10, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Various implementations can be carried out using digital electronic circuitry, or in computer software, firmware, or hardware, including the structures disclosed in this specification and their structural equivalents, or in combinations of one or more of them. Various implementations can be implemented as one or more computer programs, i.e., one or more modules of computer program instructions, encoded on one or more non-transitory computer storage mediums for execution by, or to control the operation of, data processing apparatuses. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, a computer storage medium is tangible.

Various operations described in this specification can be implemented as operations performed by a data processing apparatus on data stored on one or more computer-readable storage devices or received from other sources.

The term "data processing apparatus" or "computing device" encompasses all kinds of apparatuses, devices, and machines for processing data, including by way of example a programmable processor, a computer, a system on a chip, or multiple ones, or combinations, of the foregoing. An apparatus can include special purpose logic circuitry, e.g., an FPGA (field programmable gate array) or an ASIC (application-specific integrated circuit). An apparatus can also include, in addition to hardware, code that creates an execution environment for a computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one website or distributed across multiple sites and interconnected by a communication network.

The processes and logic flows described in this specification can be performed by programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. A processor and a memory can be supplemented by, or incorporated in, special purpose logic circuitry.

To provide for interaction with a user, various implementations can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Various implementations can be carried out using computing systems that include a back-end component, e.g., as a data server, or that include a middleware component, e.g., an application server, or that include a front-end component, e.g., a client computer having a graphical user interface or a web browser, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Computing systems can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination in a single implementation. Conversely, various features that are described in the context of a single implementation can also be carried out in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that various described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
sending, from a server over a network, information for displaying an interface to allow a user to change a wireless speed setting for a device, the interface including a selectable option for reducing a wireless speed from a default wireless speed for the device:
receiving, by the server over the network, a selected wireless speed setting input into the interface for the wireless speed setting for the device; and
sending, to a computer of a wireless network provider, a request to change the wireless speed setting for the device to the selected wireless speed setting received by the server.

2. The method of claim 1,
wherein the interface displays two or more possible wireless speed settings for the device for selection by a user.

3. The method of claim 1,
wherein an initial wireless speed setting is provided as a default setting in the interface and is determined based on a wireless data plan purchased for the device.

4. The method of claim 1,
wherein the interface allows for changing the wireless speed setting for the device to a setting that limits a download speed and an upload speed of a wireless connection between the device and a base station.

5. The method of claim 1,
wherein the interface allows for changing the wireless speed setting for the device to a setting in which a download speed and an upload speed of a wireless connection between the device and a base station are limited only by wireless network provider factors, location factors, and environmental factors at a current location of the device.

6. The method of claim 1,
wherein the server sends the information for displaying the interface over the network to a web browser when the web browser requests a web page with the interface from an account management website hosted by the server.

7. The method of claim 1, further comprising:
querying, by the server, a device database for a current wireless speed setting of the device.

8. The method of claim 7, further comprising:
generating, by the server, the information for displaying the interface such that a setting shown in the interface when the interface is initially displayed indicates the current wireless speed setting in the device database.

9. The method of claim 1, further comprising:
inserting, by the server into a device queue, an item that indicates a speed change request and a requested speed specified by the selected wireless speed setting.

10. The method of claim 9, further comprising:
periodically running a wireless provisioning job on a wireless provisioning server to query for unprocessed items that have been entered into the device queue.

11. The method of claim 10, further comprising:
performing, by the wireless provisioning job running on the wireless provisioning server for each item of the unprocessed items, one or more actions for the item and then marking an entry corresponding to the item to specify completion once all necessary actions for the item have been performed.

12. The method of claim 1, wherein the sending of the request to change the wireless speed setting comprises:
contacting, by a wireless provisioning server upon picking up an item from a device queue requesting a speed change for the device, the computer of the wireless network provider to request that an offer the device is currently provisioned with be changed to another offer that has the newly requested speed setting.

13. The method of claim 12,
wherein each offer of a plurality of offers supported by the wireless network provider has attributes including a maximum upload speed and a maximum download speed.

14. The method of claim 12,
wherein each offer has an associated identification number for specifying a request for the offer.

15. The method of claim 12, further comprising:
processing by the wireless provisioning server a next unprocessed item in the device queue if said contacting results in a failure.

16. The method of claim 1, further comprising:
receiving, by the computer of the wireless network provider, the request to change the wireless speed setting for the device to the selected wireless speed setting;
checking, by the computer of the wireless network provider, whether the selected wireless speed setting satisfies one or more validity or permissions checks; and
changing, by the computer of the wireless network provider, the wireless speed setting of the device to the selected wireless speed setting if the one or more validity or permissions checks are satisfied.

17. The method of claim 1, further comprising:
receiving, by the computer of the wireless network provider, the request to change the wireless speed setting for the device to the selected wireless speed setting; and
making a change in a database of the wireless network provider to change the wireless speed setting for the device to the selected wireless speed setting.

18. The method of claim 17, further comprising:
updating a policy for the device in a global policy server based on information associated with the device in the database of the wireless network provider.

19. The method of claim 18, further comprising:
replicating the policy for the device from the global policy server to one or more premarket or wireless area policy servers to put into effect the change of the wireless speed setting for the device.

20. The method of claim 1, further comprising:
obtaining information about a billing cycle for the user;
determining from the information about the billing cycle how much time is remaining until a billing period will end for the user; and
sending, to the computer of the wireless network provider, a request to change the wireless speed setting for the device to a particular wireless speed setting that is selected based at least partially on the time remaining until the billing period will end for the user.

21. The method of claim 1, further comprising:
receiving, by the server, information about websites that the user specifies are to be throttled;
performing deep packet inspection on one or more packets destined for the device to determine a source website for each packet; and
reducing, from the wireless speed setting, a rate at which packets originating from source websites that are specified to be throttled are forwarded to the device.

22. The method of claim 21,
wherein a proxy server of a mobile virtual network operator performs proxy operations for the device such that the one or more packets destined for the device pass through the proxy server;
wherein the mobile virtual network operator is different from the wireless network provider; and
wherein the proxy server performs the deep packet inspection on the one or more packets destined for the device to determine the source website for each packet.

23. The method of claim 1, further comprising:
determining whether the device is roaming on a network of a carrier that is different from a carrier with which the user has a contract; and
changing the wireless speed setting for the device if it is determined that the device is roaming.

24. The method of claim 1, further comprising:
determining a type of wireless technology that the device is using for a wireless connection; and
setting the wireless speed setting for the device based at least partially on the type of wireless technology that the device is using for the wireless connection.

25. The method of claim 1,
wherein the wireless speed setting for the device is set to be higher when the type of wireless technology used for the wireless connection is wi-fi than when the type of wireless technology used for the wireless connection is cellular.

26. The method of claim 1, further comprising:
monitoring an amount of data usage by the device within a billing cycle; and sending, to the computer of the wireless network provider, a request to change the wireless speed setting for the device to a particular wireless speed setting that is selected based at least partially on the amount of data that has been used by the device within the billing cycle.

27. The method of claim 1, further comprising:
rewarding the user with points based upon completion of one or more predefined actions by the user; and
allowing the user to redeem the points to increase the wireless speed setting for the device.

28. The method of claim 27, further comprising:
allowing the user to use the points to increase a wireless speed setting of another device of another user.

29. A system, comprising:
a server including a processor,
the server configured to send, over a network, information for displaying an interface to allow a user to change a wireless speed setting for a device, the interface including a selectable option for reducing a wireless speed from a default wireless speed for the device:
the server configured to receive, over the network, a selected wireless speed setting input into the interface for the wireless speed setting for the device; and
the server configured to send, to a computer of a wireless network provider, a request to change the wireless speed setting for the device to the selected wireless speed setting received by the server.

30. A non-transitory computer readable storage medium storing one or more computer programs that when executed on one or more computers cause the computers to perform a process, the process comprising:
sending over a network information for displaying an interface to allow a user to change a wireless speed setting for a device, the interface including a selectable option for reducing a wireless speed from a default wireless speed for the device:
receiving over the network a selected wireless speed setting input into the interface for the wireless speed setting for the device; and
sending, to a computer of a wireless network provider, a request to change the wireless speed setting for the device to the selected wireless speed setting received by the server.

* * * * *